United States Patent
Zhuang et al.

(10) Patent No.: US 11,804,913 B2
(45) Date of Patent: Oct. 31, 2023

(54) METHOD, APPARATUS AND SYSTEM FOR MEASURING TOTAL RADIATED POWER OF ARRAY ANTENNA

(71) Applicant: ZTE Corporation, Guangdong (CN)

(72) Inventors: Yanchun Zhuang, Shenzhen (CN); Hua Gao, Shenzhen (CN); Kunjing Zhong, Shenzhen (CN); Fei Xue, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 312 days.

(21) Appl. No.: 17/090,727

(22) Filed: Nov. 5, 2020

(65) Prior Publication Data

US 2021/0167870 A1 Jun. 3, 2021

Related U.S. Application Data

(63) Continuation of application No. PCT/CN2019/085645, filed on May 6, 2019.

(30) Foreign Application Priority Data

May 7, 2018 (CN) .......................... 201810426814.X

(51) Int. Cl.
*H04B 17/10* (2015.01)

(52) U.S. Cl.
CPC ......... *H04B 17/102* (2015.01); *H04B 17/103* (2015.01); *H04B 17/104* (2015.01)

(58) Field of Classification Search
CPC .. H04B 17/102; H04B 17/103; H04B 17/104; H04B 17/15; H04B 7/0617; H04B 17/354; H04B 7/0413; H04B 17/29
See application file for complete search history.

(56) References Cited

U.S. PATENT DOCUMENTS

| | | | |
|---|---|---|---|
| 7,852,964 B2 * | 12/2010 | Rajappan ............. | H04B 7/0413 375/147 |
| 2008/0036669 A1 * | 2/2008 | Crouch ................ | G10K 11/346 343/757 |

(Continued)

FOREIGN PATENT DOCUMENTS

| | | |
|---|---|---|
| CN | 101473556 A | 7/2009 |
| CN | 106471383 A | 3/2017 |

(Continued)

OTHER PUBLICATIONS

"Resolution, Pattern Effects, and Range of Radio Telescopes"; Kraus; IRE Transactions on Antennas and Propagation; vol. 4, Issue: 3; 1956 (Year: 1956).*

(Continued)

*Primary Examiner* — Benjamin H Elliott, IV
(74) *Attorney, Agent, or Firm* — Foley & Lardner LLP

(57) ABSTRACT

Provided are a method, apparatus and system for measuring total radiated power of an array antenna. The method includes: determining a Rayleigh resolution of the array antenna in an angle space, and setting a stepping grid spacing of sampling points according to the Rayleigh resolution; determining the sampling points according to the stepping grid spacing, measuring equivalent isotropic radiated power (EIRP) at positions of the sampling points, and determining the TRP according to the EIRP. Compared with a traditional test mode using an angle stepping grid $\theta_{grid}$ and $\varphi_{grid}$ of 15°, this reduces measurement errors; and additionally, through a normalized wave vector space transformation, the number of sampling points is further reduced, and the measurement efficiency is improved.

12 Claims, 12 Drawing Sheets

(56) References Cited

U.S. PATENT DOCUMENTS

| | | | | |
|---|---|---|---|---|
| 2011/0081869 | A1* | 4/2011 | Breit | H04B 17/10 455/67.11 |
| 2014/0237259 | A1* | 8/2014 | Karabinis | H04W 28/0236 713/189 |
| 2015/0078292 | A1* | 3/2015 | Walker | H04L 27/2607 370/329 |
| 2016/0157146 | A1* | 6/2016 | Karabinis | H04W 12/03 370/334 |
| 2016/0286532 | A1* | 9/2016 | Karabinis | H04W 28/0236 |
| 2017/0012714 | A1* | 1/2017 | Kildal | H04B 17/102 |
| 2018/0332541 | A1* | 11/2018 | Liu | H04W 52/245 |
| 2019/0229817 | A1* | 7/2019 | Axmon | H04B 7/0874 |
| 2021/0167870 | A1* | 6/2021 | Zhuang | H04B 17/103 |

FOREIGN PATENT DOCUMENTS

| | | |
|---|---|---|
| WO | WO-2017/196246 A2 | 11/2017 |
| WO | WO-2018/059821 A1 | 4/2018 |

OTHER PUBLICATIONS

"MU elements for EIRP/TRP measurements with Near Field test range at mmWave"; MVG Industries; 3GPP TSG-RAN WG4 Meeting NR-AH-1801 R4-1800848 San Diego, USA, Jan. 22-26, 2018 (Year: 2018).*

"EIRP for spherical coverage in FR2"; Samsung; 3GPP TSG-RAN WG4 Meeting #86-Bis R4-1803810 Melbourne, Australia, Apr. 16-20, 2018 (Year: 2018).*

"Revised NR UR peak EIRP and Spherical EIRP levels at mmWave"; LG Electronics; 3GPP TSG-RAN WG4 #86BIS meeting R4-1803982 Melbourne, Australia, Apr. 16-20, 2018 (Year: 2018).*

"Impact of Peak EIRP on Network Performance"; Apple Inc et al.; 3GPP TSG-RAN WG4 Meeting #86bis R4-1805325 Melbourne, Australia Apr. 16-20, 2018 (Year: 2018).*

"Proposals for concluding the peak EIRP requirement for FR2"; Apple Inc,; 3GPP TSG-RAN WG4 Meeting #86bis R4-1805769 Melbourne, Australia, Apr. 16-20, 2018 (Year: 2018).*

"EIRP characteristics for wide NR bands"; Ericsson; TSG-RAN Working Group 4 (Radio) meeting #86bis R4-1805799 Melbourne, Australia, Apr. 16-20, 2018 (Year: 2018).*

3rd Generation Partnership Project: "E-UTRA and UTRA, Radio Frequency (RF) requirement background for Active Antenna System (AAS) Base Station (BS) radiated requirements (Release 15)" Technical Specification Group Radio Access Network; 3GPP TR 37.843; V15.0.0; Dec. 2017; Valbonne, France (77 pages).

Ericsson: "TP to TR 37.843: TRP test method for unwanted emissions for eAAS BS" 3GPP TSG-RAN WG4 #86bis; R4-1805047; Apr. 20, 2018; Melbourne, Australia (26 pages).

Extended European Search Report for EP Appl. No. 19799439.5, dated Dec. 1, 2021 (10 pages).

J. Friden et al.: "Angular sampling, Test Signal, and Near Field Aspects for Over-the-Air Total Radiated Power Assessment in Anechoic Chambers" Mar. 29, 2018; arxiv.org; Cornell University Library, 201 Olin Library Cornell University Ithaca, NY 14853 (14 pages).

C. Mungan, "Approximation for the Rayleigh Resolution of a Circular Aperture", The Physics Teacher 47, 288-289 (2009) https://doi.org/10.1119/1.3116839.

Office Action for EP Appl. No. 19799439.5, dated Nov. 16, 2022 (7 pages).

* cited by examiner

METHOD, APPARATUS AND SYSTEM FOR MEASURING TOTAL RADIATED POWER OF ARRAY ANTENNA

CROSS-REFERENCE TO RELATED APPLICATIONS

This application claims the benefit of priority under 35 U.S.C. § 120 as a continuation of PCT Patent Application No. PCT/CN2019/085645, filed on May 6, 2019, which claims priority to Chinese patent application no. 201810426814.X, filed on May 7, 2018, the disclosure of each of which is incorporated herein by reference in its entirety.

TECHNICAL FIELD

The present application relates to the technical field of wireless communications and, in particular, to a method, apparatus and system for measuring total radiated power (TRP) of an array antenna.

BACKGROUND

As the content with higher quality, higher definition and a faster response speed is more and more demanding, the 5th-generation (5G) mobile communication technology emerges, which includes multiple new techniques, such as massive multiple input multiple output (massive-MIMO) array antenna, beam forming and millimeter wave communications. The millimeter wave communication technique mainly refers to a communication technique where electromagnetic waves with millimeter wavelengths (frequencies ranging from 30 GHz to 300 GHz) are used as a carrier for a base station accessing a network. The intervention of the millimeter wave technique has reduced an element size to a millimeter scale. The massive-MIMO array antenna technique is widely used in 5G communication products. The number of element units of an array antenna ranges from 128 to 256, even to 512. These cases all have successful application instances. The design of millimeter wave circuits and the application of the massive-MIMO array antenna require the integration of an active antenna system (AAS) and a radio remote unit (RRU).

In the 3rd generation partnership project (3GPP), standard TS38.104 stipulates that a millimeter wave AAS integrated base station belongs to a 2-O type 5G equipment, and a radio frequency index of the millimeter wave AAS integrated base station needs to be measured in a millimeter wave chamber in a manner of over the air (OTA). TRP of the base station is a key OTA test item and a basis for measuring multiple radio frequency indexes such as base station output power, spurs, and adjacent channel leakage ratio (ACLR).

In a traditional TRP measurement at a low frequency band (sub 6 GHz), American cellular telecommunications and Internet association (CTIA) specification and Chinese communication industry standard YD/T 1484 stipulate that the angle stepping grids $\theta_{grid}$ and $\varphi_{grid}$ are both 15°. However, for a millimeter wave massive-MIMO array antenna base station, the above mentioned test specification leads to relatively large measurement errors.

SUMMARY

Embodiments of the present disclosure provide a method, apparatus and system for measuring TRP of an array antenna, so as to reduce measurement errors.

An embodiment of the present disclosure provides a method for measuring total radiated power (TRP) of an array antenna. The method includes steps described below.

Rayleigh resolutions of the array antenna in an angle space are determined, stepping grid spacings of sampling points are set according to the Rayleigh resolutions.

The sampling points are determined according to the stepping grid spacings, equivalent isotropic radiated power (EIRP) is measured at positions of the sampling point, and the TRP is determined according to the EIRP.

An embodiment of the present disclosure further provides an apparatus for measuring total radiated power (TRP) of an array antenna. The apparatus includes a stepping grid spacing set module and a TRP determination module.

The stepping grid spacing set module is configured to determine Rayleigh resolutions of an array antenna in an angle space, and set stepping grid spacings of sampling points according to the Rayleigh resolutions.

The TRP determination module is configured to determine the sampling points according to the stepping grid spacings, measure equivalent isotropic radiated power (EIRP) at positions of the sampling points, and determine the TRP according to the EIRP.

An embodiment of the present disclosure further provides a system for measuring total radiated power (TRP) of an array antenna. The system includes an equipment under test fixed on a turntable, a test antenna system, a power detector and a test machine. The equipment under test includes the array antenna and a radio remote unit which are integrated together. The power detector is connected to the test antenna system. The test machine is connected to the equipment under test, the turntable, the test antenna system and the power detector, respectively.

The test machine is configured to: determine Rayleigh resolutions of the array antenna in an angle space, set stepping grid spacings of sampling points according to the Rayleigh resolutions, determine the sampling points according to the stepping grid spacings, control the equipment under test, the turntable, the test antenna system and the power detector to measure equivalent isotropic radiated power (EIRP) at positions of the sampling points, and determine the TRP according to the EIRP.

An embodiment of the present disclosure further provides a method for measuring total radiated power (TRP) of an array antenna. The method includes steps described below.

Grid spacings of sampling points of the array antenna are determined in a normalized wave vector space;
  uniform sampling points in the normalized wave vector space are determined according to the grid spacings;
  corresponding non-uniform sampling points in an angle space are determined according to the uniform sampling points in the normalized wave vector space; and
  EIRP is measured in the angle space according to positions of the non-uniform sampling points in a spherical coordinate system, and the TRP is determined according to the EIRP.

An embodiment of the present disclosure further provides an apparatus for measuring total radiated power (TRP) of an array antenna. The apparatus includes a grid spacing determination module, a uniform sampling point determination module, a non-uniform sampling point determination module and a TRP determination module.

The grid spacing determination module is configured to determine grid spacings of sampling points of the array antenna in a normalized wave vector space;

the uniform sampling point determination module is configured to determine uniform sampling points in the normalized wave vector space according to the grid spacings;

the non-uniform sampling point determination module is configured to determine corresponding non-uniform sampling points in an angle space according to the uniform sampling points in the normalized wave vector space; and the TRP determination module is configured to measure EIRP in the angle space according to positions of the non-uniform sampling points in a spherical coordinate system, and determine the TRP according to the EIRP.

An embodiment of the present disclosure further provides a system for measuring total radiated power (TRP) of an array antenna. The system includes an equipment under test fixed on a turntable, a test antenna system, a power detector and a test machine. The equipment under test includes the array antenna and a radio remote unit which are integrated together. The power detector is connected to the test antenna system. The test machine is connected to the equipment under test, the turntable, the test antenna system and the power detector, respectively.

The test machine is configured to: determine grid spacings of sampling points of the array antenna in a normalized wave vector space, determine uniform sampling points in the normalized wave vector space according to the grid spacings, determine corresponding non-uniform sampling points in an angle space according to the uniform sampling points in the normalized wave vector space, control the equipment under test, the turntable, the test antenna system and the power detector to measure EIRP in the angle space according to positions of the non-uniform sampling points in a spherical coordinate system, and determine the TRP according to the EIRP.

Another embodiment of the present disclosure further provides a storage medium. The storage medium stores a computer program, which is configured to, when running, implement the steps in any method embodiment above.

Another embodiment of the present disclosure further provides an electronic apparatus. The electronic apparatus includes a memory and a processor. The memory stores a computer program. The processor is configured to execute the computer program to implement the steps in any method embodiment above.

Compared with a traditional test manner using the angle stepping grids $\theta_{grid}$ and $\varphi_{grid}$ of 15°, the embodiments of the present disclosure reduce the measurement errors, and additionally, through a normalized wave vector space transformation, the number of sampling points is further reduced, and the measurement efficiency is improved.

Other features and advantages of the present disclosure will be elaborated hereinafter in the description and, moreover, partially become apparent from the description, or will be understood through the implementation of the present disclosure. The object and other advantages of the present disclosure may be implemented and obtained through structures set forth in the description, claims and drawings.

BRIEF DESCRIPTION OF DRAWINGS

The drawings are used to provide a further understanding of the schemes of the present disclosure, constitute a part of the description, explain the schemes of the present disclosure in conjunction with embodiments of the present application, and do not limit the schemes of the present disclosure.

DETAILED DESCRIPTION

The embodiments of the present disclosure are described below in detail in conjunction with the drawings. It is to be noted that if not in collision, the embodiments described herein and the features thereof may be combined with each other.

The steps illustrated in the flowcharts among the drawings may be performed by, for example, a computer system capable of executing a set of computer-executable instructions. Moreover, although logical sequences are illustrated in the flowcharts, the illustrated or described steps may be performed in sequences different from those described herein in some cases.

At present, TRP may be measured in a millimeter wave chamber by using a three-dimensional turntable. The process includes following steps: an equipment under test (EUT) is fixed on a turntable, and equivalent isotropic radiated power (EIRP) of the EUT is measured through a receive probe in a far field. An EIRP distribution in an antenna spherical field is measured by using the conical tangent method or the large circle tangent method in a spherical coordinate system. Finally, the TRP is calculated with reference to the formula (quoted from 3GPP TS37.843) described below.

$$TRP \approx \frac{\pi}{2NM} \sum_{n=0}^{N-1} \sum_{m=0}^{M-1} EIRP(\theta_n, \varphi_m) \sin(\theta_n) \quad (1)$$

According to formula (1), the TRP is calculated based on N×M times of the EIRP measurement. Values of N and M depend on the stepping grids of θ and φ:

$$N = \frac{180°}{\theta_{grid}} \text{ and } M = \frac{360°}{\varphi_{grid}}$$

In a traditional TRP measurement at a low frequency band (sub 6 GHz), American specification CTIA and Chinese communication industry standard YD/T 1484 stipulate that the angle stepping grids $\theta_{grid}$ and $\varphi_{grid}$ are both 15°.

Figure 1:
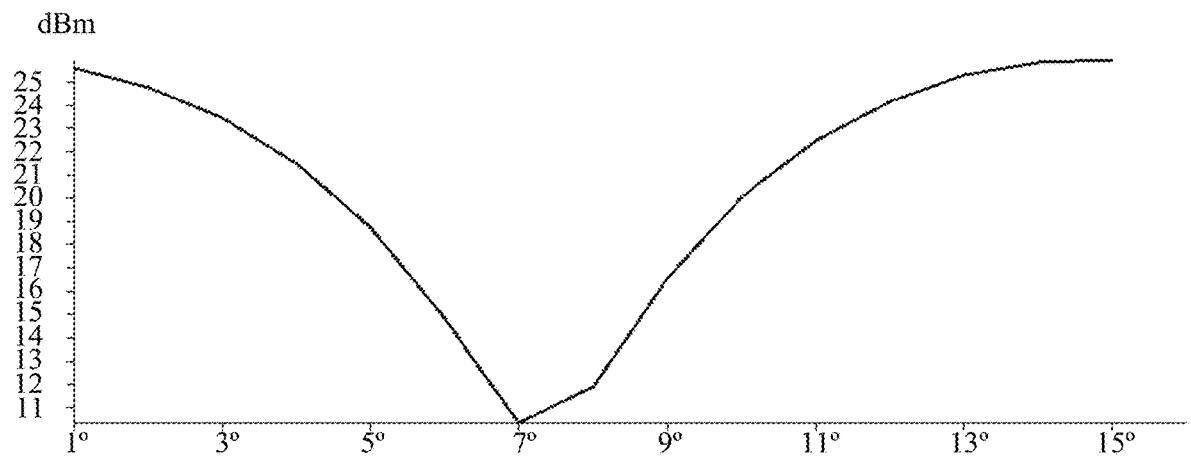
FIG. 1 shows a great fluctuation of a calculated TRP value in a case of initial scanning angles θ and φ vary, and $\theta_{grid}$ and $\varphi_{grid}$ of an 8×16 element array each have a scanning spacing of 15°.

Using a mature 128-element (8×16 arranged) array antenna as an example, a transmit signal is at 30 GHz, the stepping grids $\theta_{grid}$ and $\varphi_{grid}$ in a spherical measurement are both 15°, and the TRP is measured according to the traditional scheme (that is, measurement steps in YD/T 1484). To quantitatively observe the measurement errors, an initial position of measuring EIRP on a sphere varies from 1° to 15°. Referring to FIG. 1, a variation curve of a final test value of the TRP relative to a real value of the TRP is obtained. A unit spacing of the array antenna is 0.5λ, the abscissa refers to a position of a scanning starting point. This traditional scanning spacing of 15° is generally applied to a sub 6 GHz terminal equipment. It can be seen from FIG. 1 that, using the scanning spacing of 15°, a calculated result of the TRP fluctuates about 14 dB as the position of the starting point varies. The main reason is that a first null beamwidth (FNBW) of a millimeter wave array antenna is less than an FNBW of a traditional sub 6 GHz antenna beam. For a spherical energy density space of a millimeter wave base station antenna, the angle grid sampling according to 15° causes distorted measurement results. Therefore, the scanning spacing of 15° can no longer accurately reflect the value of the TRP. It is necessary to increase the number of points and increase the scanning density.

Since the traditional TRP test scheme with the scanning spacing of 15° cannot be effectively applied to the TRP measurement of the millimeter wave array antenna, it is necessary to upgrade the traditional test scheme and even design a brand-new test scheme to deal with this situation.

The technique for measuring the TRP of the millimeter wave massive-MIMO array antenna is still under study. Currently, a conventional scheme adopted by well-known millimeter wave chambers (such as Key Sight Company of the United States, and MVG Company of France) is to measure the EIRP by using the stepping grids $\theta_{grid}$ and $\varphi_{grid}$ not greater than 1°, obtain a fine three-dimensional pattern, and then calculate the TRP. However, this method theoretically requires at least 360×180 times of the measurement, and the efficiency is not high.

In a word, the traditional TRP algorithm using the grid of 15° is no longer applicable to the total radiated power measurement of the millimeter wave array antenna of a 5G base station. However, the conventional scheme using the stepping about 1° in the chamber leads to too many sampling points, and the measurement efficiency is low.

The embodiments of the present disclosure provide a method, apparatus and system for measuring TRP of an array antenna, which can reduce the measurement errors and improve the measurement efficiency.

The test environment is described below.

Generally, according to an exemplary embodiment, a microwave chamber may be used for a complete far field characterization of an EUT (for example, including a transmit chain and a receive chain) having the millimeter wave array antenna. Additionally, at least one test antenna, a receive link and a detection device may be used to test the distribution of radiated energy.

Figure 2:
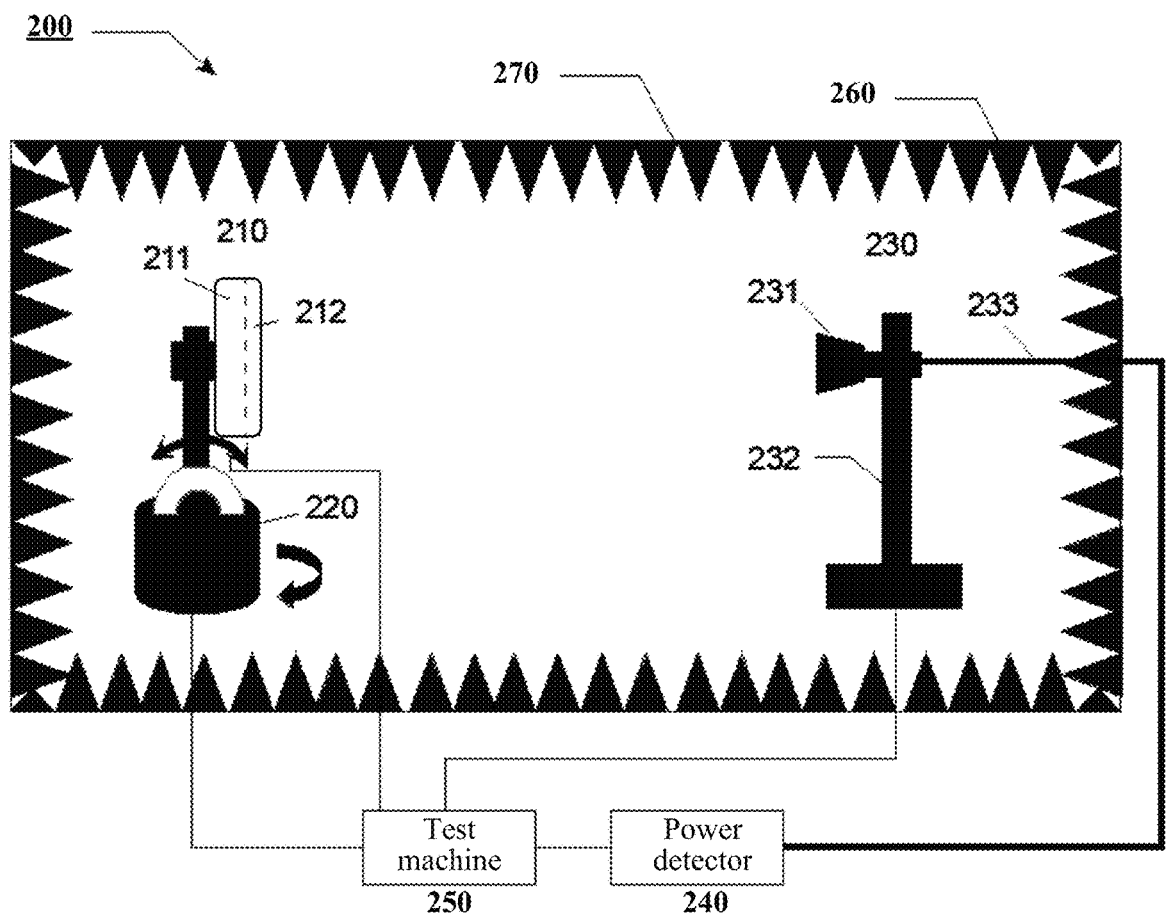
FIG. 2 is a schematic diagram of a test system according to an embodiment of the present disclosure.

FIG. 2 is a schematic diagram of a chamber OTA test system for measuring TRP of a millimeter wave AAS equipment according to an exemplary embodiment.

Referring to FIG. 2, the system 200 is configured to measure the TRP of an EUT 210. The EUT 210 includes a radio remote unit (RRU) 211 and an array antenna 212. The array antenna 212 and the RRU 211 are tightly integrated to form an integrated device, as shown by a dotted line. Contrary to the case where an RRU and an antenna system are separate and independently measurable, a transmit channel and a receive channel of the EUT 210 are directly connected to a unit of the array antenna 212. In the described embodiments, the array antenna 212 may be an antenna arranged in a matrix type or other irregularly arranged antennas, and the radiated electromagnetic wave energy may be in a millimeter wave band.

Since the array antenna 212 and the RRU 211 are integrated together without a radio connection, the array antenna cannot be tested in isolation. This means that radio frequency complete machine indexes, including the EIRP, the TRP, an equivalent omnidirectional sensitivity (EIRS) and a total omnidirectional sensitivity (TIS), cannot be calculated by simply testing the radiation performance of the array antenna 212 and the transmit and receive link performance of the RRU 211. The measurements need to be performed on the EUT 210 simultaneously.

The EUT 210 is fixed on a turntable 220. The turntable 220 is rotatable on a horizontal plane and a pitch plane.

The test antenna system 230 includes a test antenna 231, an antenna fixed support 232 and a test cable 233. The test antenna 231 may be a single antenna or multiple antennas. The antenna fixed support 232 is configured to fix the test antenna 231 and may move in a three-dimensional space. The test antenna 231 is connected to a power detector 240 through the test cable 233. The power detector 240 may be a vector network analyzer, a spectrometer, a power meter or the like.

The EUT 210, the turntable 220, the antenna fixed support 232 and the power detector 240 are connected to a test machine 250. The test machine 250 may be configured to control the transmission and reception of the EUT 210, the rotation of the turntable 220, the movement of the antenna fixed support 232, and the transmission and reception of the power detector 240, record, process relevant test data including the value of the EIRP, and record log.

During the whole test process, the full anechoic chamber environment is isolated from the external environment by an absorbing material 260 and a chamber exterior wall 270, so as to simulate the case of an infinite space.

Figure 3:
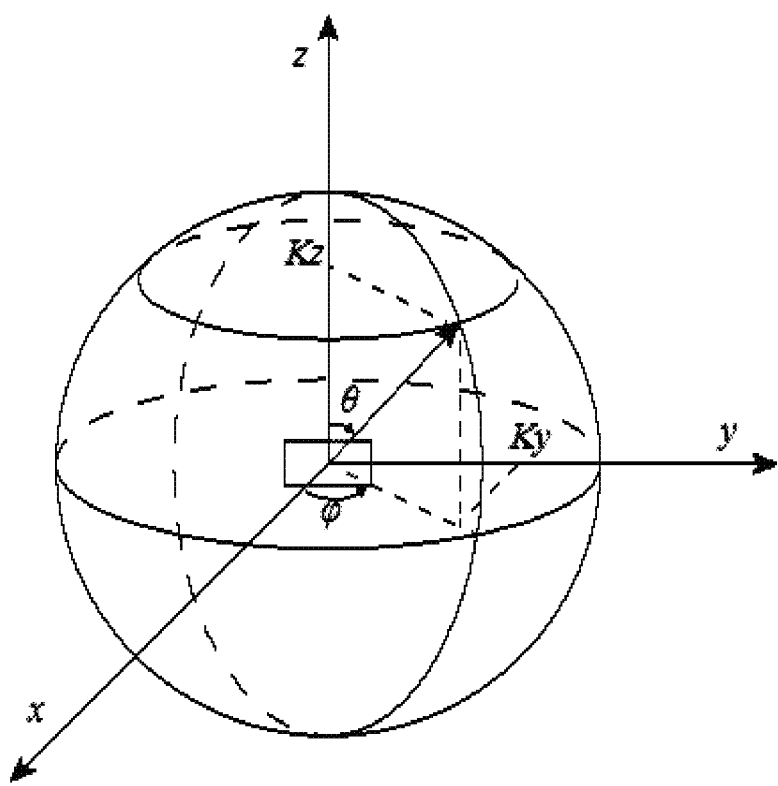
FIG. 3 is a spatial coordinate system of a test environment according to an embodiment of the present disclosure.

FIG. 3 is a schematic diagram of a coordinate system having a reference point of the array antenna 212 on the EUT 210 according to an exemplary embodiment. An x-axis is basically consistent with a normal direction of the antenna array plane. A y-axis and a z-axis respectively correspond to a horizontal direction and a vertical direction. Here, two spatial coordinates are used to describe directions. One is an angle space, which is represented by (θ, φ) in a spherical coordinate system. For example, a wave vector direction calibrated as (90°, 0°) means pointing to the x-axis direction. The other one is a normalized wave vector space, which is represented by ($K_y$, $K_z$) in a cartesian coordinate system. $K_y$ and $K_z$ respectively denote a size of a normalized wave vector projected on the y-axis and on the z-axis. For example, a wave vector direction calibrated as (0, 0) means pointing to the x-axis direction. There is a spatial transformation relation between the angle space (θ, φ) and the normalized wave vector space ($K_y$, $K_z$).

Figure 4A:
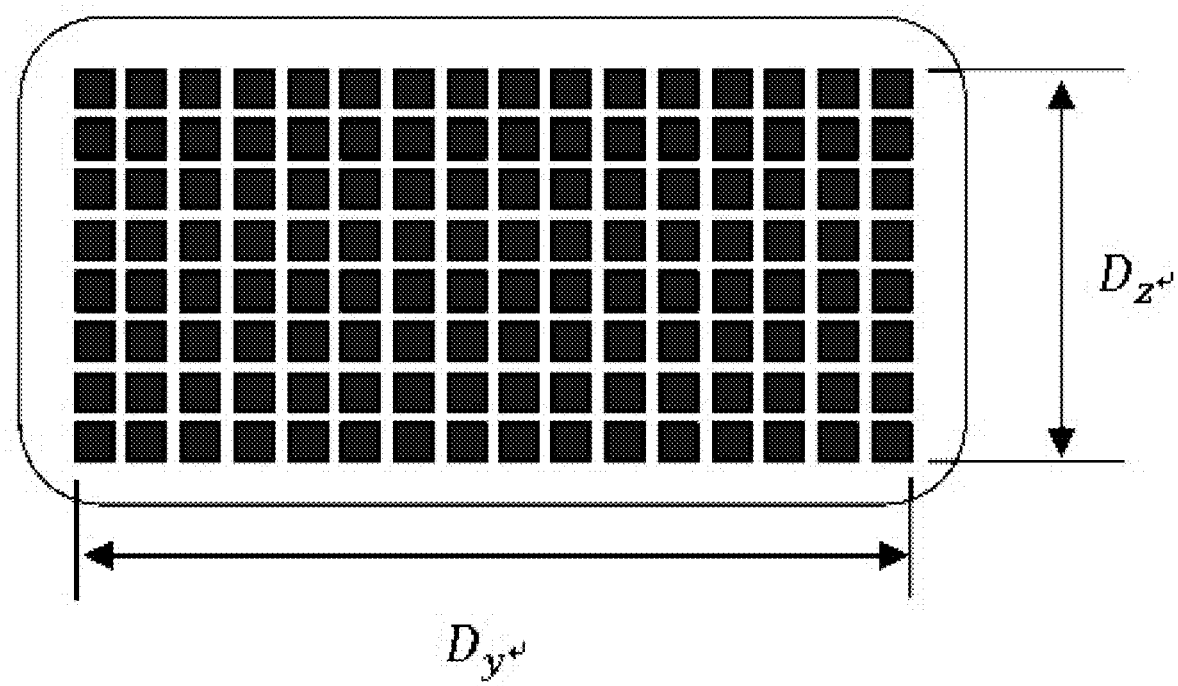
FIG. 4A is a schematic diagram of a regular rectangular element array.
Figure 4B:
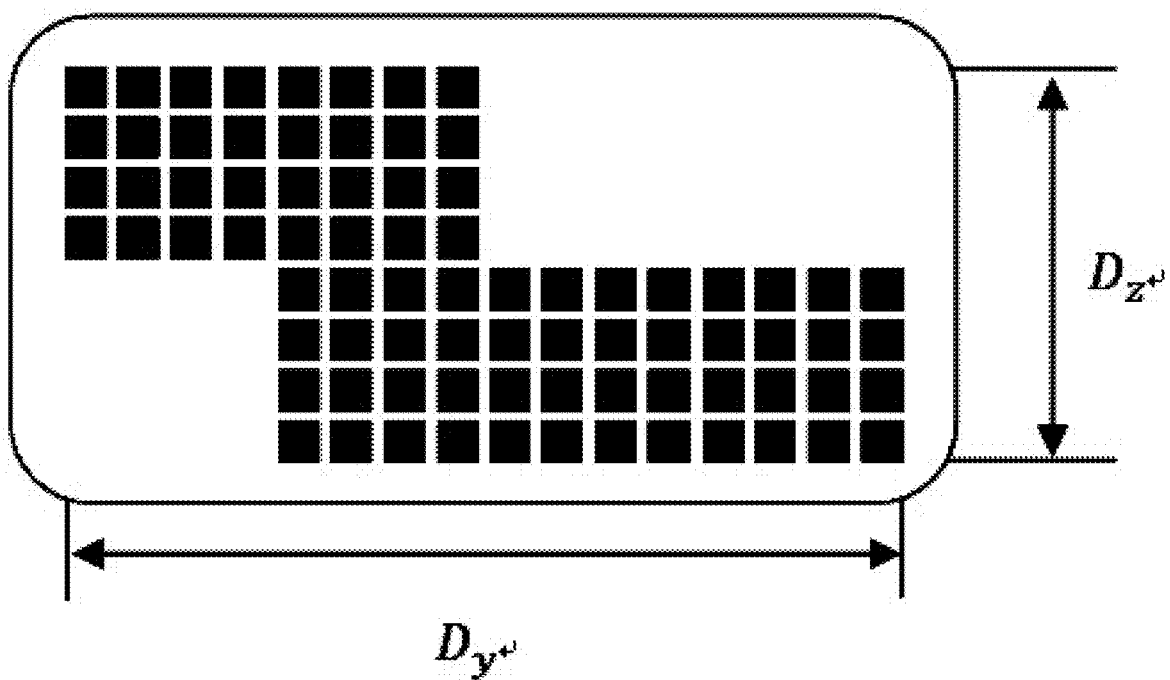
FIGS. 4B and 4C are each a schematic diagram of an irregular array.
Figure 4C:
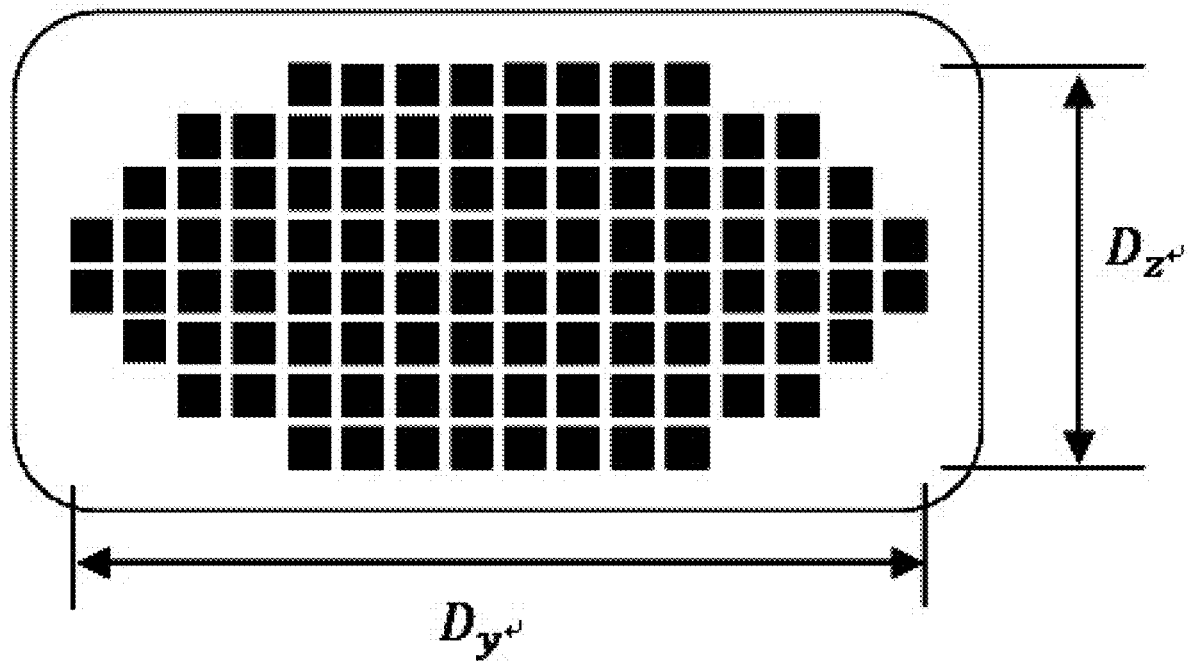

FIGS. 4A-4C show several arrangements of array units in the array antenna 212 according to an exemplary embodiment. FIG. 4A shows a common rectangular array, a unit spacing in the rectangular array is d, and each unit is generally a square with a side length of a. Side lengths of the rectangular array in the y direction and in the z direction are respectively $D_y$ and $D_z$. Since the unit spacing d is generally λ/2 and the side length a is not greater than the unit spacing d, the side lengths of an M×N array satisfy that $D_y \approx N\lambda/2$ and $D_z \approx M\lambda/2$. Using an 8×16 array antenna as an example, the antenna size may be represented as $D_y \approx 8\lambda$ and $D_z \approx 4\lambda$. A far field pattern of the array antenna is approximately a Fourier transform having the shape of the array antenna. Therefore, according to the Nyquist sampling law, as long as a sampling spacing in a θ direction and a sampling spacing in a φ direction are respectively less than Rayleigh resolutions $\sin^{-1}(\lambda/D_y)$ and $\sin^{-1}(\lambda/D_z)$, the discrete sampling hardly loses array information. Using this sampling spacing, an integral value of the TRP may represent a real value of the TRP of this rectangular array.

FIG. 4B shows a Z-type array. This shape is irregular and corresponds to a pattern lacks apparent regularity, but this shape may be regarded as a $D_y \times D_z$ rectangular array without some units in an upper right corner and a lower left corner. $D_y$ and $D_z$ may be regarded as the maximum size of the Z-type array respectively in the y direction and in the z direction. Therefore, according to the Nyquist sampling law, in the case where the sampling spacings in the pattern are respectively less than the Rayleigh resolutions corresponding to $D_y$ and $D_z$, the discrete sampling hardly loses information about the equivalent rectangular array, and thus, information about the Z-type array will not be lost. Using this sampling spacing, an integral value of the TRP may represent a real value of the TRP of the Z-type array.

FIG. 4C shows an O-type array. A pattern corresponding to this shape tends to be an airy disk. Similarly, this shape may be regarded as a $D_y \times D_z$ rectangular array without some units around the array. Therefore, according to the Nyquist sampling law, in the case where the sampling spacings in the pattern are respectively less than the Rayleigh resolutions corresponding to $D_y$ and $D_z$, the discrete sampling hardly loses information about the equivalent rectangular array, and thus, information about the O-type array will not be lost. Using this sampling spacing, an integral value of the TRP may represent a real value the TRP of the O-type array.

From the above three examples, it can be analyzed that each irregular shaped array may be regarded as a rectangular array. The side lengths of the rectangular array in the y direction and in the z direction are respectively the maximum sizes of the irregular shaped array in the y direction and in the z direction. As long as the sampling spacings do not lose information about the rectangular array, the integral value of the TRP may represent the real value of the TRP. Therefore, in the discussion described below, only the case of the rectangular array is considered.

The embodiments of the present disclosure provide two sampling schemes. One is a sampling scheme using an equal angle spacing in the angle space. This scheme is referred to as a uniform sampling scheme. The other one a sampling scheme to perform an equal spacing sampling in the normalized wave vector space. This sampling method shows unequal spacings in the angle space, and thus may be referred to as a non-uniform sampling scheme.

The two schemes are described below respectively.

1. Uniform Sampling Scheme

The uniform sampling scheme includes sampling the EIRP in the traditional angle space and calculating the TRP. The uniform sampling scheme avoids great errors in the TRP measurement of a millimeter wave array antenna according to the traditional test specifications (standard YD/T 1484 and specification CTIA).

Figure 5:
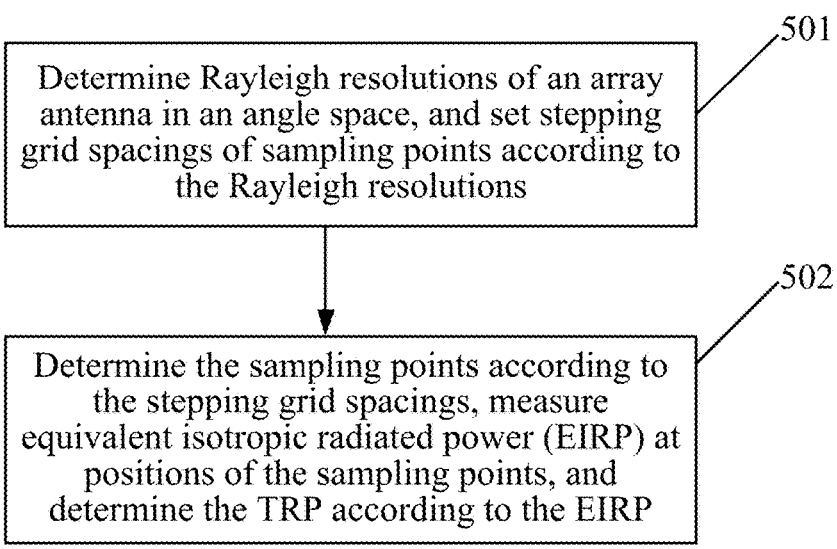
FIG. 5 is a flowchart of a method for measuring TRP of an array antenna by using a uniform sampling scheme according to an embodiment of the present disclosure.

As shown in FIG. 5, a method for measuring TRP of an array antenna by using the uniform sampling scheme according to an embodiment of the present disclosure includes steps described below.

In step 501, Rayleigh resolutions of the array antenna in an angle space are determined, and stepping grid spacings of sampling points are set according to the Rayleigh resolutions.

The Rayleigh resolutions of the array antenna in the angle space may be determined in different manners according to whether an array size of the array antenna is known.

(1) The array size of the array antenna is known.

The Rayleigh resolutions of the array antenna in the angle space are determined according to a signal wavelength and an array size of the array antenna.

In an embodiment, the Rayleigh resolutions of the array antenna in the angle space are determined according to the signal wavelength and the array size of the array antenna in the manner described below.

$$\theta_r = \frac{180°}{\pi}\sin^{-1}\left(\frac{\lambda}{D_z}\right) \text{ and } \varphi_r = \frac{180°}{\pi}\sin^{-1}\left(\frac{\lambda}{D_y}\right) \quad (2)$$

θr denotes a Rayleigh resolution of the array antenna in a θ direction of the spherical coordinate system and φr denotes a Rayleigh resolution of the array antenna in a φ direction of the spherical coordinate system, $D_y$ denotes a maximum antenna aperture of the array antenna in a horizontal direction and $D_z$ denotes a maximum antenna aperture of the array antenna in a vertical direction, and λ denotes the signal wavelength.

In a case where θr and φr have relatively small values, the Rayleigh resolutions of the array antenna in the angle space may be determined according to the signal wavelength and the array size of the array antenna in the manner described below.

$$\theta_r = \frac{180°}{\pi}\frac{\lambda}{D_z} \text{ and } \varphi_r = \frac{180°}{\pi}\frac{\lambda}{D_y} \quad (3)$$

(2) The array size of the array antenna is unknown.

First null beamwidths (FNBWs) are determined. The Rayleigh resolutions of the array antenna in the angle space are determined according to the FNBWs.

In the case where the size of the antenna array cannot be accurately known (for example, a base station equipment having a radome hard to be open), FNBWs of a main beam may be measured on a pitch plane and on an azimuth plane of the spherical coordinate system containing a maximum radiated power point.

In an embodiment, the Rayleigh resolutions of the array antenna in the angle space are determined according to the FNBWs in the manner described below.

$$\theta_r = FNBW_\theta/2 \text{ and } \varphi_r = FNBW_\varphi/2$$

$\theta r$ denotes a Rayleigh resolution of the array antenna in a $\theta$ direction of the spherical coordinate system and $\varphi_r$ denotes a Rayleigh resolution of the array antenna in a $\varphi$ direction of the spherical coordinate system. $FNBW_\theta$ denotes an FNBW of a pattern on the pitch plane of the spherical coordinate system and $FNBW_\varphi$ denotes an FNBW of the pattern on the azimuth plane of the spherical coordinate system.

In step 502, the sampling points are determined according to the stepping grid spacings, equivalent isotropic radiated power (EIRP) is measured at positions of the sampling points, and the TRP is determined according to the EIRP.

In an embodiment, the stepping grid spacings of the sampling points are set to be less than or equal to the Rayleigh resolutions.

In other words, the sampling step spacings should not be greater than the Rayleigh resolutions ($\theta r$, $\varphi r$) of the array antenna in the $\theta$ direction and in the $\varphi$ direction of the spherical coordinate system. That is, $\theta_{grid} \leq \theta_r$ and $\varphi_{grid} \leq \varphi_r$.

In a practical application, the stepping grid spacings of the sampling points may set to be equal to the Rayleigh resolutions.

The step of determining the TRP according to the EIRP may be calculating the TRP according to the EIRP by using formula (1).

Additionally, for a high-frequency 5G base station, output signal power of the millimeter wave massive-MIMO array antenna of the base station is basically concentrated on a front hemisphere containing the main beam, while the backward radiation is relatively small, and the contribution of the backward radiation to the TRP may be ignored, so the rear hemisphere is no longer valued.

Therefore, in an embodiment, formula (1) is slightly modified.

$$TRP = \frac{\pi}{4NM} \sum_{n=0}^{N-1} \sum_{m=0}^{M-1} EIRP(\theta_n, \phi_m) \sin(\theta_n) \quad (4)$$

$$M = \frac{180°}{\phi_{grid}}, N = \frac{180°}{\theta_{grid}}, \theta_{grid}$$

denotes a stepping grid spacing in the $\theta$ direction of the spherical coordinate system and $\varphi_{grid}$ denotes a stepping grid spacing in the $\varphi$ direction of the spherical coordinate system.

It should be noted that in this embodiment of the present disclosure, the step of determining the TRP according to the EIRP may, but is not necessarily, use formula (1) and formula (4). For example, it is also feasible to modify formula (1) or formula (4) to use different coordinate systems, and the like.

Compared with the traditional scheme, the uniform sampling scheme of this embodiment of the present disclosure can improve the calculation accuracy. Using a 128-element (8×16 arranged) array antenna as an example, a transmitted millimeter wave signal is at 30 GHz, according to the stepping grid of 15° in the traditional algorithm, a calculated result of the TRP has an error fluctuation more than 14 dB as the initial angle of the full anechoic chamber turntable varies. If the array scale is greater, the error will also increase. In the uniform sampling scheme of the present disclosure, the Rayleigh resolutions are used as the stepping grids, and the error fluctuation of the TRP does not exceed 0.15 dB under a same test stress.

Compared with the conventional scheme, the uniform sampling scheme of this embodiment of the present disclosure can improve the calculation efficiency. Still using the 128-element (8×16 arranged) array antenna as an example, the uniform sampling is performed by using the stepping grid of 1° according to the conventional measurement method of a current mainstream millimeter wave chamber, and 32400 (180×180) sampling points are required for implementing a hemispherical scanning. However, using the Rayleigh resolutions in the angle space for stepping, the number of sampling points does not exceed 338 (26×13), and the efficiency is improved by 95 times.

Figure 6:
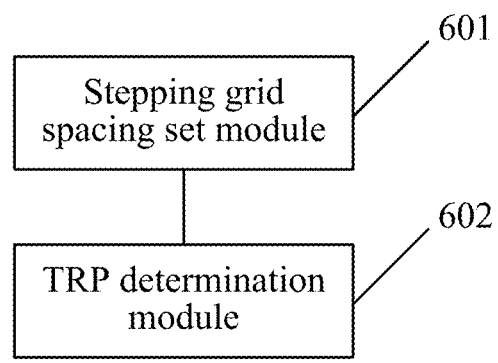
FIG. 6 is a schematic diagram of an apparatus for measuring TRP of an array antenna by using a uniform sampling scheme according to an embodiment of the present disclosure.

As shown in FIG. 6, an apparatus for measuring TRP of an array antenna according to an embodiment of the present disclosure includes a stepping grid spacing set module 601 and a TRP determination module 602.

The stepping grid spacing set module 601 is configured to determine Rayleigh resolutions of the array antenna in an angle space, and set stepping grid spacings of sampling points according to the Rayleigh resolutions.

The TRP determination module 602 is configured to determine the sampling points according to the stepping grid spacings, measure equivalent isotropic radiated power (EIRP) at positions of the sampling points, and determine the TRP according to the EIRP.

In an embodiment, the stepping grid spacing set module 601 is configured to perform steps described below.

The Rayleigh resolutions of the array antenna in the angle space are determined according to a signal wavelength and an array size of the array antenna.

Alternatively, first null beamwidths (FNBWs) are determined, and the Rayleigh resolutions of the array antenna in the angle space are determined according to the FNBWs.

In an embodiment, the stepping grid spacing set module 601 is configured to determine the Rayleigh resolutions of the array antenna in the angle space according to the signal wavelength and the array size of the array antenna in a manner described below.

$$\theta_r = \frac{180°}{\pi}\sin^1\left(\frac{\lambda}{D_z}\right) \text{ and } \varphi_r = \frac{180°}{\pi}\sin^1\left(\frac{\lambda}{D_y}\right), \text{ or}$$

$$\theta_r = \frac{180°}{\pi}\frac{\lambda}{D_z} \text{ and } \varphi_r = \frac{180°}{\pi}\frac{\lambda}{D_y}.$$

$\theta_r$ denotes the Rayleigh resolution of the array antenna in the $\theta$ direction of the spherical coordinate system and $\varphi_r$ denotes the Rayleigh resolution of the array antenna in the $\varphi$ direction of the spherical coordinate system, $D_y$ denotes a maximum antenna aperture of the array antenna in a horizontal direction and $D_z$ denotes a maximum antenna aperture of the array antenna in a vertical direction, and A denotes the signal wavelength.

In an embodiment, the stepping grid spacing set module 601 is configured to measure FNBWs of a main beam on a pitch plane and on an azimuth plane of the spherical coordinate system containing a maximum radiated power point.

In an embodiment, the stepping grid spacing set module 601 is configured to determine the Rayleigh resolutions of the array antenna in the angle space according to the FNBWs in the manner described below.

$$\theta_r = FNBW_\theta/2 \text{ and } \varphi_r = FNBW_\varphi/2$$

$\theta_r$ denotes the Rayleigh resolution of the array antenna in the $\theta$ direction and $\varphi_r$ denotes the Rayleigh resolution of the array antenna in the $\varphi$ direction of the spherical coordinate system. $FNBW_\theta$ denotes an FNBW of a pattern on the pitch plane and $FNBW_\varphi$ denotes an FNBW of the pattern on the azimuth plane of the spherical coordinate system.

In an embodiment, the stepping grid spacing set module 601 is configured to set the stepping grid spacings of the sampling points to be less than or equal to the Rayleigh resolutions.

In an embodiment, the TRP determination module 602 is configured to determine the TRP according to the EIRP in the manner described below.

$$TRP = \frac{\pi}{4NM} \sum_{n=0}^{N-1} \sum_{m=0}^{M-1} (\theta_n, \phi_m) \sin(\theta_n)$$

$$M = \frac{180°}{\phi_{grid}}, N = \frac{180°}{\theta_{grid}}, \theta_{grid}$$

denotes a stepping grid spacing in the $\theta$ direction of the spherical coordinate system and $\varphi_{grid}$ denotes a stepping grid spacing in the $\varphi$ direction of the spherical coordinate system.

Compared with the traditional test manner using the angle stepping grids $\theta_{grid}$ and $\varphi_{grid}$ of 15°, the embodiments of the present disclosure reduce the measurement errors. Compared with the uniform sampling with the stepping grid of 1°, the number of sampling points is reduced, and the measurement efficiency is improved.

Correspondingly, referring to FIG. 2, an embodiment of the present disclosure provides a system for measuring total radiated power (TRP) of an array antenna. The system includes an equipment under test 210 fixed on a turntable 220, a test antenna system 230, a power detector 240 and a test machine 250. The equipment under test 210 includes the array antenna 212 and a remote radio frequency unit 211 which are integrated together. The power detector 240 is connected to the test antenna system 230. The test machine 250 is connected to the equipment under test 210, the turntable 220, the test antenna system 239 and the power detector 240, respectively.

The test machine 250 is configured to: determine Rayleigh resolutions of the array antenna 212 in an angle space, and set stepping grid spacings of sampling points according to the Rayleigh resolutions; determine the sampling points according to the stepping grid spacings, control the equipment under test 210, the turntable 220, the test antenna system 230 and the power detector 240 to measure equivalent isotropic radiated power (EIRP) at positions of the sampling points, and determine the TRP according to the EIRP.

Figure 7A:
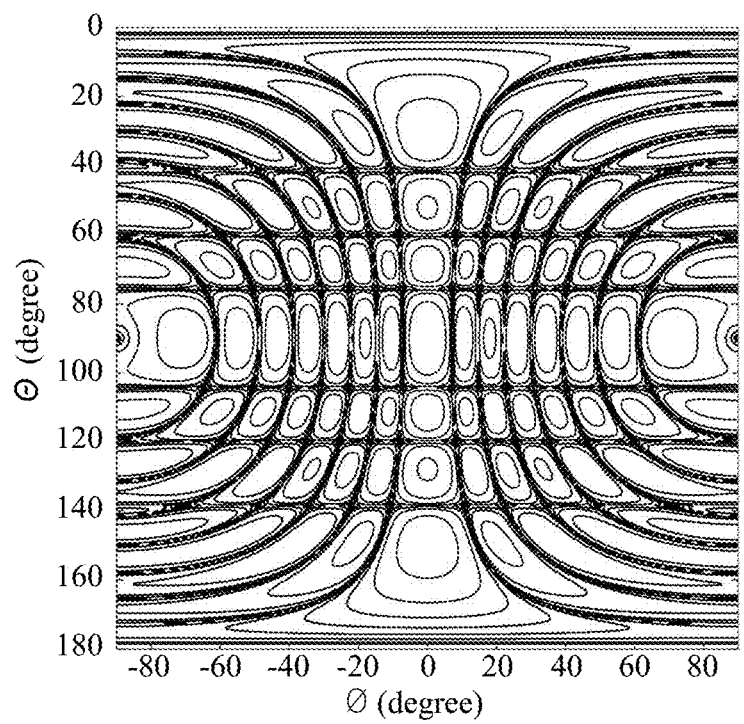
FIGS. 7A and 7B are each a two-dimensional plane development of a simulated three-dimensional pattern of an experimental antenna in an angle space.
Figure 7B:
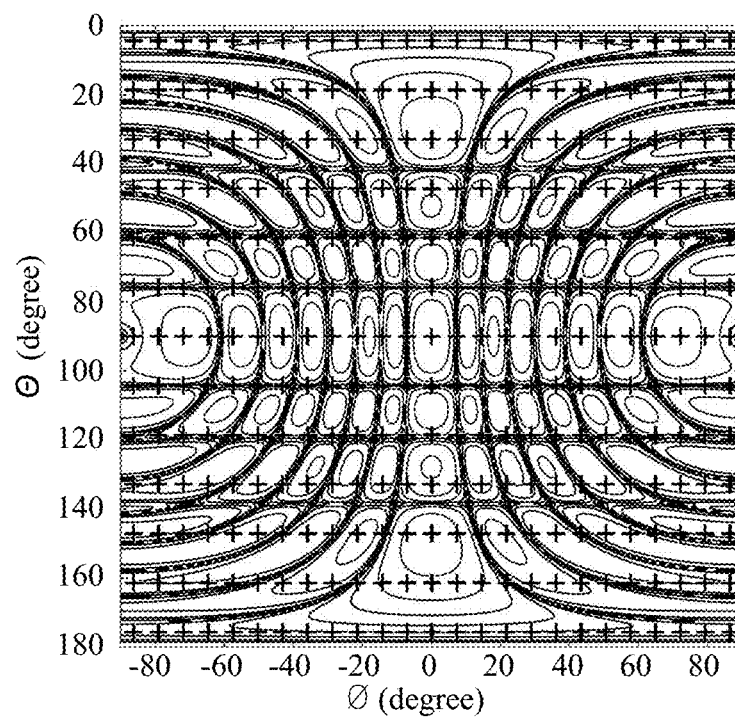

FIGS. 7A and 7B are each a demonstration of a simulated pattern and the uniform sampling scanning scheme of an 8×16 rectangular array 410 according to an exemplary embodiment. In the rectangular array, each unit is identical in the amplitude and the phase, a unit spacing d is $\lambda/2$, and the unit size satisfies that $D_y \approx 8\lambda$ and $D_z \approx 4\lambda$. The array antenna is parallel to a y-z plane, and a normal direction of the array plane is parallel to an x-axis. A two-dimensional pattern in FIG. 7A shows the EIRP distribution of the rectangular antenna in a front hemispherical angle space ($\theta$, $\varphi$). The maximum value of the EIRP is at (90°, 0), that is, in the x-axis direction. Multiple contour lines spaced by 10 dB divide the pattern into several regions. The shade of color represents the magnitude of the value of the EIRP. The lighter the color, the greater the value of the EIRP; the darker the color, the smaller the value of the EIRP. A mesh composed of lines having the most dark color may be seen in the two-dimensional pattern. These mesh points and the dark curves composing the mesh are exactly null positions of the value of the EIRP.

On the pitch plane where $\varphi=0$, the first null beamwidth may be named $FNBW_\theta$, which is related to the antenna size $D_z$, that is, $FNBW_\theta/2 = \theta_r = \sin^{-1}(\lambda/D_z)$, where $\theta_r = \sin^{-1}(\lambda/D_z)$ and may be referred to as the Rayleigh resolution on the pitch plane. Similarly, on the azimuth plane where $\theta=90°$, the first null beamwidth may be named $FNBW_\varphi$, and $FNBW_\varphi/2 = \varphi_r = \sin^{-1}(\lambda/D_y)$, where $\varphi_r = \sin^{-1}(\lambda/D_y)$ and may be referred to as the Rayleigh resolution on the azimuth plane. According to the Nyquist sampling law, in the case where the spacings of two-dimensional sampling grids on the azimuth plane and on the pitch plane are less than the respective Rayleigh resolution, that is, $\theta_{grid} \leq \theta_r$, and $\varphi_{grid} \leq \varphi_r$, the sampling hardly damages the array information and may be regarded as lossless sampling. Therefore, on the basis of the above sampling, a calculated value of the TRP should be consistent with the real value of the TRP. This sampling scheme is referred to as the uniform sampling scheme, as indicated by a periodic array labeled with "+" in the angle space radiation sampling diagram of FIG. 7B. In the sample diagram of FIG. 7B, the values of $\theta_{grid}$ and $\varphi_{grid}$ are identical to the respective Rayleigh resolution, so value points include a first null point on the pitch plane ($\varphi=0$) and a first null point on the azimuth plane ($\theta=90°$). This is the most economical and fast uniform sampling solution.

2. Non-Uniform Sampling Scheme

The non-uniform sampling scheme introduces the concept of the normalized wave vector space. This scheme is to acquire uniform sampling points in the normalized wave vector space firstly, and then, calculate non-uniform sampling points in the angle space by using a transformation formula, thereby implementing the compression on the sampling points.

This scheme is to sample uniformly in the normalized wave vector space ($K_y$, $K_z$). The transformation relation between the normalized wave vector space ($K_y$, $K_z$) and the angle space ($\theta$, $\varphi$) is described below.

$$K_y = \sin\theta \sin\varphi \text{ and } K_z = \cos\theta \quad (5)$$

In the non-uniform sampling scheme, redundant sampling points are removed through normalized wave vector space sampling, so that the number of sampling points is greatly reduced. The test efficiency of the non-uniform sampling scheme is apparently improved compared with that of the uniform sampling scheme (the test efficiency of the non-uniform sampling scheme is more than three times of the uniform sampling scheme).

Figure 8:
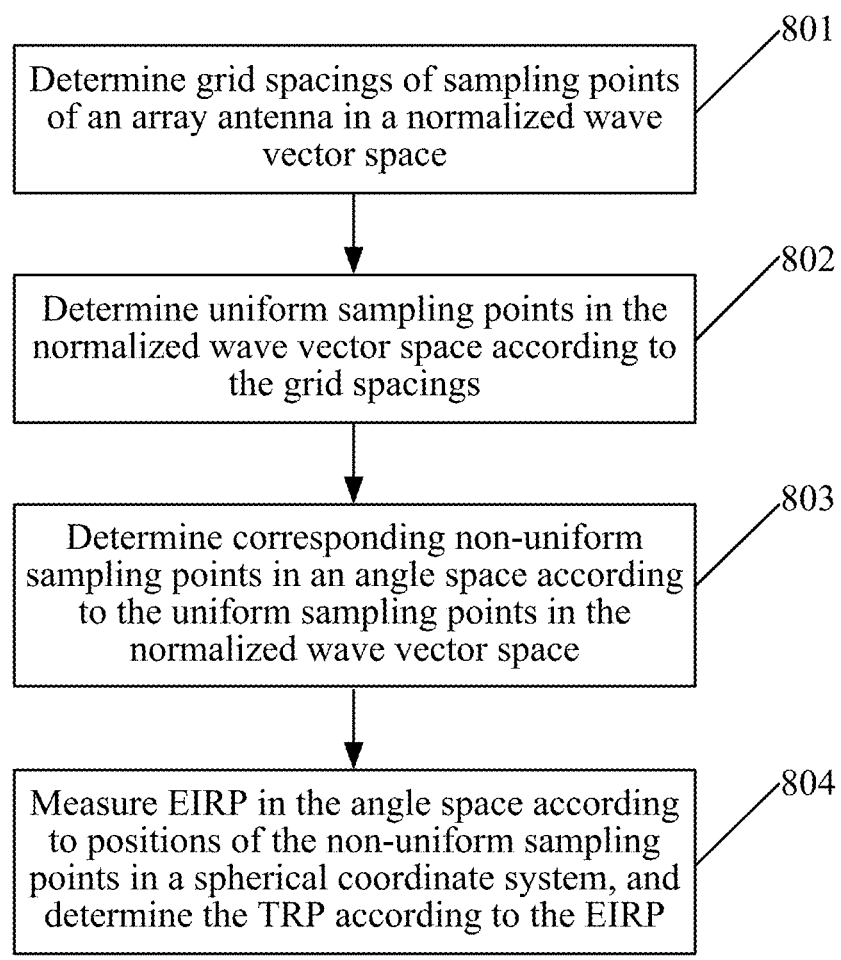
FIG. 8 is a flowchart of a method for measuring TRP of an array antenna by using a non-uniform sampling scheme according to an embodiment of the present disclosure.

As shown in FIG. 8, a method for measuring TRP of an array antenna by using a non-uniform sampling scheme according to an embodiment of the present disclosure includes the steps described below.

In step 801, grid spacings $K_{grid,y}$ and $K_{grid,z}$ of sampling points of the array antenna in the normalized wave vector space are determined.

In an embodiment, Rayleigh resolutions of the array antenna in the wave vector space are determined, and the grid spacings of the sampling points of the array antenna in the normalized wave vector space are determined according to the Rayleigh resolutions.

The Rayleigh resolutions of the array antenna in the wave vector may be determined in different manners according to whether the array size of the array antenna is known.

(1) The array size of the array antenna is known.

The Rayleigh resolutions of the array antenna in the wave vector space are determined according to the signal wavelength and the array size of the array antenna.

In an embodiment, the Rayleigh resolutions of the array antenna in the wave vector space are determined according to the signal wavelength and the array size of the array antenna in the manner described below.

$$K_{yr}=\lambda/D_y \text{ and } K_{zr}=\lambda/D_z \quad (6)$$

$K_{yr}$ and $K_{zr}$ denote the Rayleigh resolutions of the array antenna in the wave vector space, $D_y$ denotes a maximum antenna aperture of the array antenna in a horizontal direction and $D_z$ denotes a maximum antenna aperture of the array antenna in a vertical direction, and $\lambda$ denotes the signal wavelength.

(2) The array size of the array antenna is unknown.

Rayleigh resolutions of the array antenna in the angle space are determined, and the Rayleigh resolutions in the angle space are transformed to the Rayleigh resolutions in the wave vector space.

In an embodiment, FNBWs are determined, and the Rayleigh resolutions of the array antenna in the angle space are determined according to the FNBWs.

In the case where the size of the antenna array cannot be accurately known (for example, a base station equipment having a radome hard to be open), FNBWs of a main beam are measured on the pitch plane and on the azimuth plane of the spherical coordinate system containing a maximum radiated power point.

In an embodiment, the Rayleigh resolutions of the array antenna in the angle space are determined according to the FNBWs in the manner described below.

$$\theta_r=FNBW_\theta/2 \text{ and } \varphi_r=FNBW_\varphi/2$$

$\theta_r$ denotes the Rayleigh resolution of the array antenna in the $\theta$ direction and $\varphi_r$ denotes the Rayleigh resolution of the array antenna in the $\varphi$ direction of the spherical coordinate system. $FNBW_\theta$ denotes an FNBW of a pattern on the pitch plane of the spherical coordinate system and $FNBW_\varphi$ denotes an FNBW of the pattern on the azimuth plane of the spherical coordinate system.

In an embodiment, the grid spacings of the sampling points of the array antenna in the normalized wave vector space are set to be less than or equal to the Rayleigh resolutions.

In this embodiment of the present disclosure, the grid spacings $K_{grid,y}$ and $K_{grid,z}$ of the sampling points in the normalized wave vector space are not greater than the Rayleigh resolutions $K_{yr}$ and $K_{zr}$ of the array antenna in the wave vector space.

In practical application, the grid spacings of the sampling points of the array antenna in the normalized wave vector space may be set to be equal to the Rayleigh resolutions.

In step 802, uniform sampling points ($K_{ym}$, $K_{zn}$) in the normalized wave vector space are determined according to the grid spacings.

In an embodiment, the uniform sampling is performed in the normalized wave vector space according to the grid spacings $K_{grid,y}$ and $K_{grid,z}$ to obtain a group of discrete values, so as to form vector sampling points $\vec{K}_{m,n}=\hat{y}K_{ym}+\hat{z}K_{zn}$ in the normalized wave vector space, and vectors ($K_{ym}$, $K_{zn}$) satisfying $|\vec{K}_{m,n}|<1$ are selected as the uniform sampling points in the normalized wave vector space.

In step 803, corresponding non-uniform sampling points in the angle space are determined according to the uniform sampling points in the normalized wave vector space.

In an embodiment, ($\theta_n$, $\varphi_{m,n}$), corresponding to the uniform sampling points ($K_{ym}$, $K_{zn}$) in the normalized wave vector space, in the angle space are determined through a transformation relation between the normalized wave vector space ($K_y$, $K_z$) and the angle space ($\theta$, $\varphi$).

Through transformation formula (5), ($\theta_n$, $\varphi_{m,n}$) corresponding to ($K_{ym}$, $K_{zn}$) are found in the angle space. $\theta_n$ and $\varphi_{m,n}$ are non-uniformly distributed in the angle space.

In step 804, EIRP is measured in the angle space according to positions of the non-uniform sampling points ($\theta_n$, $\varphi_{m,n}$) in the spherical coordinate system, and the TRP is determined according to the EIRP.

In an embodiment, the TRP is determined according to the EIRP in the manner described below.

$$TRP = \frac{K_{grid,y}K_{grid,z}}{4\pi} \sum_{|\vec{K}_{m,n}|<1} \frac{EIRP(\theta_n, \phi_{m,n})}{\sin(\theta_n)\cos(\phi_{m,n})} \quad (7)$$

$K_{grid,y}$ denotes a grid spacing of the sampling points in a y direction of the normalized wave vector space and $K_{grid,z}$ denotes a grid spacing of the sampling points in a z direction of the normalized wave vector space.

$\vec{K}_{m,n}$ denotes a normalized wave vector of a sampling point. The relation $|\vec{K}_{m,n}|<1$ refers to selecting only sampling points having a modulus value less than 1. That is, a filtering for the modulus value less than 1 is performed.

A pitch angle $\theta_n$ and an azimuth angle $\varphi_{m,n}$ are discrete values in the angle space which are corresponding to a normalized wave vector discrete sampling point $$\vec{K}_{m,n}|_{|\vec{K}_{m,n}|<1}.$$

That is, the process of taking discrete values of the normalized wave vector discrete sampling points $$\vec{K}_{m,n}|_{|\vec{K}_{m,n}|<1}$$

filtered for the modulus value less than 1 is completed.

$EIRP(\theta_n, \varphi_{m,n})$ denotes the EIRP of a discrete sampling point ($\theta_n$, $\varphi_{m,n}$) in the angle space.

Formula (7) may be expressed in the wave vector space. In this case, parameters $\theta_n$ and $\varphi_{m,n}$ may be represented by components $K_{ym}$ and $K_{zn}$ of the normalized wave vector $\vec{K}_{m,n}$ in the y direction and in the z direction through space transformation formulas $K_y=\sin\theta\sin\varphi$ and $K_z=\cos\theta$.

Compared with the traditional scheme, the non-uniform sampling scheme of this embodiment of the present disclosure can improve the calculation accuracy. Using the 128-element (8×16 arranged) array antenna as an example, a transmitted millimeter wave signal is at 30 GHz, according to the stepping grid of 15° of the traditional algorithm, a calculated result of the TRP has an error fluctuation more than 14 dB as the initial angle of the full anechoic chamber turntable varies. If the array scale becomes greater, the error will also increase. The error fluctuation of the non-uniform sampling algorithm implemented in the present disclosure does not exceed 0.3 dB.

Compared with the conventional scheme, the non-uniform sampling scheme in this embodiment of the present disclosure can improve the calculation efficiency. Still using the 128-element (8×16 arranged) array antenna as an example, the uniform sampling is performed by using the stepping grid of 1° according to the conventional measurement method of a current mainstream millimeter wave chamber, and 32400 (180×180) sampling points are required to implement the hemispherical scanning. However, in the non-uniform sampling using the Rayleigh resolutions of the wave vector space for stepping, the number of sampling points does not exceed 93, and the efficiency is improved by 348 times.

Figure 9:
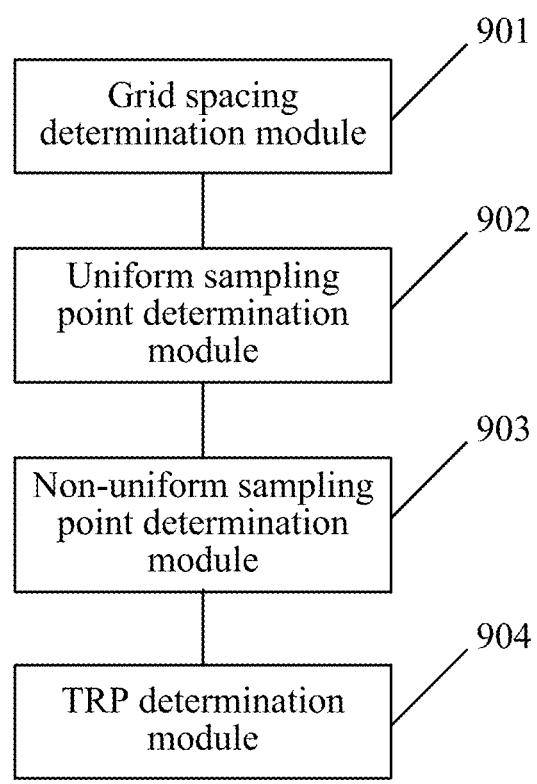
FIG. 9 is a schematic diagram of an apparatus for measuring TRP of an array antenna by using a non-uniform sampling scheme according to an embodiment of the present disclosure.

As shown in FIG. 9, an apparatus for measuring TRP of an array antenna by using a non-uniform sampling scheme according to an embodiment of the present disclosure includes a grid spacing determination module 901, a uniform sampling point determination module 902, a non-uniform sampling point determination module 903 and a TRP determination module 904.

The grid spacing determination module 901 is configured to determine grid spacings of sampling points of the array antenna in a normalized wave vector space.

The uniform sampling point determination module 902 is configured to determine uniform sampling points in the normalized wave vector space according to the grid spacings.

The non-uniform sampling point determination module 903 is configured to determine corresponding non-uniform sampling points in an angle space according to the uniform sampling points in the normalized wave vector space.

The TRP determination module 904 is configured to measure EIRP in the angle space according to positions of the non-uniform sampling points in a spherical coordinate system, and determine the TRP according to the EIRP.

In an embodiment, the grid spacing determination module 901 is configured to determine Rayleigh resolutions of the array antenna in the wave vector space, and determine the grid spacings of the sampling points of the array antenna in the normalized wave vector space according to the Rayleigh resolutions.

In an embodiment, the grid spacing determination module 901 is configured to determine the Rayleigh resolutions of the array antenna in the wave vector space according to a signal wavelength and an array size of the array antenna; or, to determine Rayleigh resolutions of the array antenna in the angle space, and transform the Rayleigh resolutions in the angle space to the Rayleigh resolutions in the wave vector space.

In an embodiment, the stepping grid spacing determination module 901 is configured to determine the Rayleigh resolutions of the array antenna in the angle space according to the signal wavelength and the array size of the array antenna in the manner described below.

$K_{yr}=\lambda/D_y$ and $K_{zr}=\lambda/D_z$ $K_{yr}$ and $K_{zr}$ denote the Rayleigh resolutions of the array antenna in the wave vector space. $D_y$ denotes a maximum antenna aperture of the array antenna in a horizontal direction and $D_z$ denotes a maximum antenna aperture of the array antenna in a vertical direction. $\lambda$ denotes the signal wavelength.

In an embodiment, the grid spacing determination module 901 is configured to determine first null beamwidths (FNBWs), and determine the Rayleigh resolutions of the array antenna in the angle space according to the FNBWs.

In an embodiment, the stepping grid spacing determination module 901 is configured to measure FNBWs of a main beam on a pitch plane and on an azimuth plane of the spherical coordinate system containing a maximum radiated power point.

In an embodiment, the stepping grid spacing determination module 901 is configured to determine the Rayleigh resolutions of the array antenna in the angle space according to the FNBWs in the manner described below.

$\theta_r$=FNBW$_\theta$/2 and $\varphi_r$=FNBW$_\varphi$/2.

$\theta_r$ denotes a Rayleigh resolution of the array antenna in a $\theta$ direction of the spherical coordinate system and $\varphi_r$ denotes a Rayleigh resolution of the array antenna in a $\varphi$ direction of the spherical coordinate system. FNBW$_\theta$ denote an FNBW of a pattern on the pitch plane of the spherical coordinate system and FNBW$_\varphi$ denotes an FNBW of the pattern on the azimuth plane of the spherical coordinate system.

In an embodiment, the grid spacing determination module 901 is configured to set the grid spacings of the sampling points of the array antenna in the normalized wave vector space to be less than or equal to the Rayleigh resolutions.

In an embodiment, the uniform sampling point determination module 902 is configured to perform uniform sampling in the normalized wave vector space according to the grid spacings $K_{grid,y}$ and $K_{grid,z}$ to obtain a group of discrete values, so as to form vector sampling points $\vec{K}_{m,n}=\hat{y}K_{ym}+\hat{z}K_{zn}$ in the normalized wave vector space; and to select vectors ($K_{ym}$, $K_{zn}$) satisfying $|\vec{K}_{m,n}|<1$ as the uniform sampling points in the normalized wave vector space.

In an embodiment, the non-uniform sampling point determination module 903 is configured to determine ($\theta_n$, $\varphi_{m,n}$), corresponding to the uniform sampling points ($K_{ym}$, $K_{zn}$) in the normalized wave vector space, in the angle space through a transformation relation between the normalized wave vector space ($K_y$, $K_z$) and the angle space ($\theta$, $\varphi$).

The transformation relation between the normalized wave vector space ($K_y$, $K_z$) and the angle space ($\theta$, $\varphi$) is described below.

$K_y$=sin $\theta$ sin $\varphi$, and $K_z$=cos $\theta$.

In an embodiment, the TRP determination module 904 is configured to determine the TRP according to the EIRP in the manner described below.

$$TRP = \frac{K_{grid,y}K_{grid,z}}{4\pi} \sum_{|\vec{K}_{m,n}|<1} \frac{EIRP(\theta_n, \phi_{m,n})}{\sin(\theta_n)\cos(\phi_{m,n})}$$

$K_{grid,y}$ denotes a grid spacing of the sampling points in a y direction of the normalized wave vector space and $K_{grid,z}$ denotes a grid spacing of the sampling points in a z direction of the normalized wave vector space.

$\vec{K}_{m,n}$ denotes a normalized wave vector of a sampling point. A pitch angle $\theta_n$ and an azimuth angle $\varphi_{m,n}$ are discrete values in the angle space which are corresponding to a normalized wave vector discrete sampling point $\vec{K}_{m,n}|_{|\vec{K}_{m,n}|<1}$.

EIRP($\theta_n$, $\varphi_{m,n}$) denotes the EIRP of a discrete sampling point ($\theta_n$, $\varphi_{m,n}$) in the angle space.

The above formula may be expressed in the wave vector space. In this case, parameters $\theta_n$ and $\varphi_{m,n}$ may be represented by components $K_{ym}$ and $K_{zn}$ of the normalized wave vector $\vec{K}_{m,n}$ in the y direction and in the z direction through space transformation formulas $K_y=\sin\theta \sin\varphi$ and $K_z=\cos\theta$.

Compared with the traditional test manner using the angle stepping grids $\theta_{grid}$ and $\varphi_{grid}$ of 15°, the embodiments of the present disclosure reduce the measurement errors. Compared with the uniform sampling using the stepping grid of 1°, the number of sampling points is reduced, and the measurement efficiency is improved.

Correspondingly, referring to FIG. 2, an embodiment of the present disclosure provides a system for measuring total radiated power (TRP) of an array antenna. The system includes an equipment under test 210 fixed on a turntable 220, a test antenna system 230, a power detector 240 and a test machine 250. The equipment under test 210 includes the array antenna 212 and a remote radio frequency unit 211 which are integrated together. The power detector 240 is connected to the test antenna system 230. The test machine 250 is connected to the equipment under test 210, the turntable 220, the test antenna system 239 and the power detector 240, respectively.

The test machine 250 is configured to: determine grid spacings of sampling points of the array antenna in a normalized wave vector space, determine uniform sampling points in the normalized wave vector space according to the grid spacings, determine corresponding non-uniform sampling points in an angle space according to the uniform sampling points in the normalized wave vector space, control the equipment under test 210, the turntable 220, the test antenna system 230 and the power detector 240 to measure EIRP in the angle space according to positions of the non-uniform sampling points in a spherical coordinate system, and determine the TRP according to the EIRP.

Figure 10A:
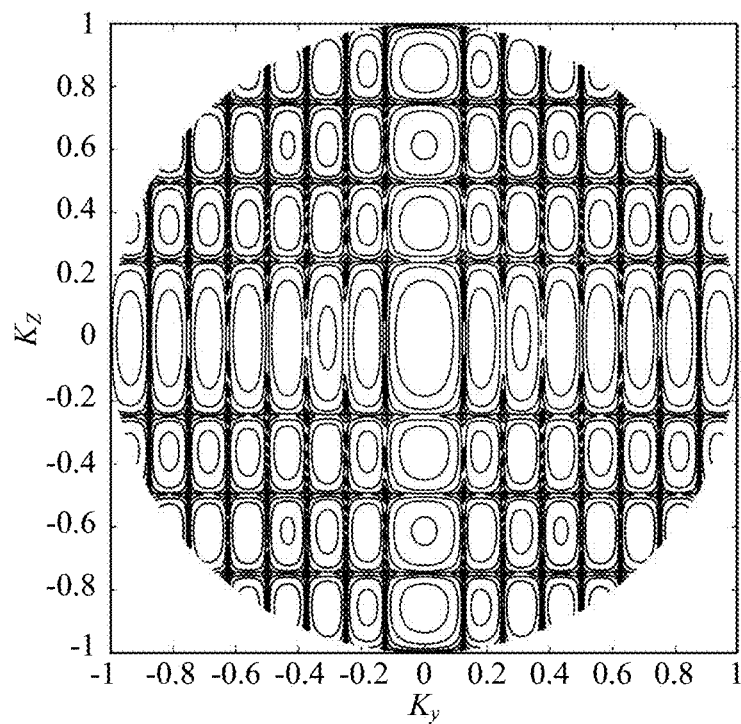
FIGS. 10A and 10B are each a two-dimensional plane development of a simulated three-dimensional pattern of an experimental antenna in a normalized wave vector space.
Figure 10B:
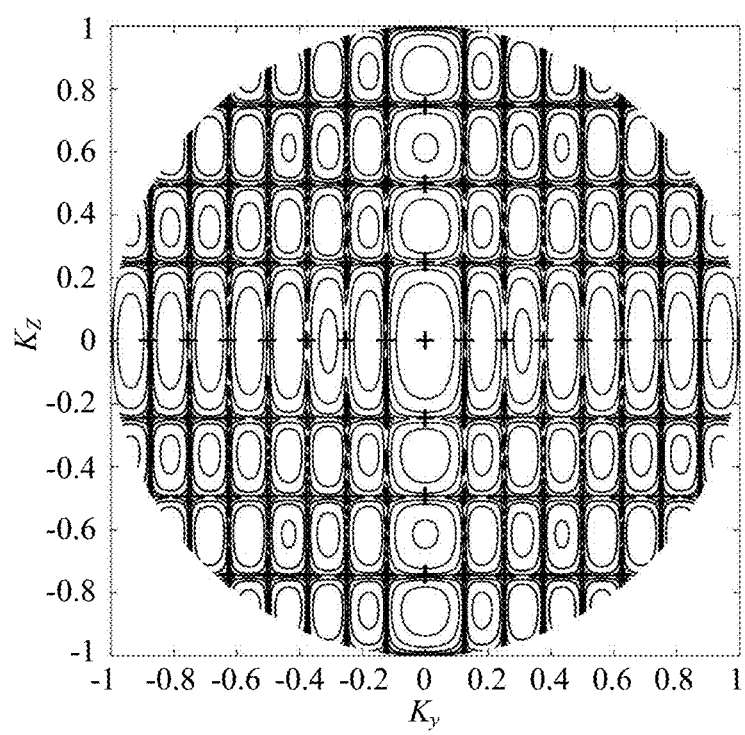

FIGS. 10A and 10B are each a demonstration of a simulated pattern by using a non-uniform sampling scanning scheme of an 8×16 rectangular array according to an exemplary embodiment. In the rectangular array, each unit is identical in the amplitude and the phase, a unit spacing d is $\lambda/2$, and a unit size satisfies $D_y\approx 8\lambda$ and $D_z\approx 4\lambda$. The array antenna is parallel to a y-z plane, and a normal direction of the array plane is parallel to an x-axis. In FIG. 10A, a two-dimensional pattern shows a distribution of the EIRP of the rectangular antenna in the normalized wave vector space ($K_y$, $K_z$). The maximum value of the EIRP is at position (0, 0), that is, in the x-axis direction. Multiple contour lines spaced by 10 dB divide the pattern into several regions. The shade of color represents the magnitude of the value of the EIRP. The lighter the color, the greater the EIRP value; the darker the color, the smaller the value of the EIRP. In FIG. 10A, a periodic mesh composed of lines having the most dark color may be seen in the two-dimensional pattern. These periodic mesh points and the dark lines composing the mesh are exactly null positions of the value of the EIRP.

In the normalized wave vector space ($K_y$, $K_z$), it can be seen that null points are uniformly arranged with an equal spacing in the y direction and in the z direction. The equal spacing may be represented by the first null power beamwidths in the angle space, that is, sin(FNBW$_\varphi$/2) and sin(FNBW$_\theta$/2) respectively corresponding to the Rayleigh resolutions $K_{yr}$ and $K_{zr}$ ($K_{yr}=\lambda/D_y$ and $K_{zr}=\lambda/D_z$) in the y direction and in the z direction of the normalized wave vector space. According to the Nyquist sampling law, in the case where the spacings of two-dimensional sampling grids in the normalized wave vector space are less than the respective Rayleigh resolution, that is, $K_{grid,y}\leq K_{yr}$ and $K_{grid,z}\leq K_{zr}$, the sampling hardly damages the array information and may be regarded as lossless sampling. Therefore, on the basis of the above sampling, a calculated value of the TRP should be consistent with the real value of the TRP. In FIG. 10B, a periodic array labeled with "+" in a normalized wave vector space radiation sampling diagram demonstrates the above sampling scheme. In the sample diagram of FIG. 10B, the values of $K_{grid,y}$ and $K_{grid,z}$ are respectively identical to the Rayleigh resolutions, so value points include all null points in the y direction and in the z direction. These sampling points are uniformly distributed in the normalized wave vector space ($K_y$, $K_z$), but non-uniformly distributed in the angle space. Actually, the distribution of these sampling points in the angle space ($\theta$, $\varphi$) exactly covers grid points formed by the null curves, as shown in FIG. 7A. Therefore, this sampling scheme may be referred to as the non-uniform sampling scheme. The sampling diagram in FIG. 10B is a particular example of the non-uniform sampling scheme, which is the most economical and fast example of the non-uniform sampling scheme.

The embodiments of the present disclosure are described below using application instances.

Figure 11:
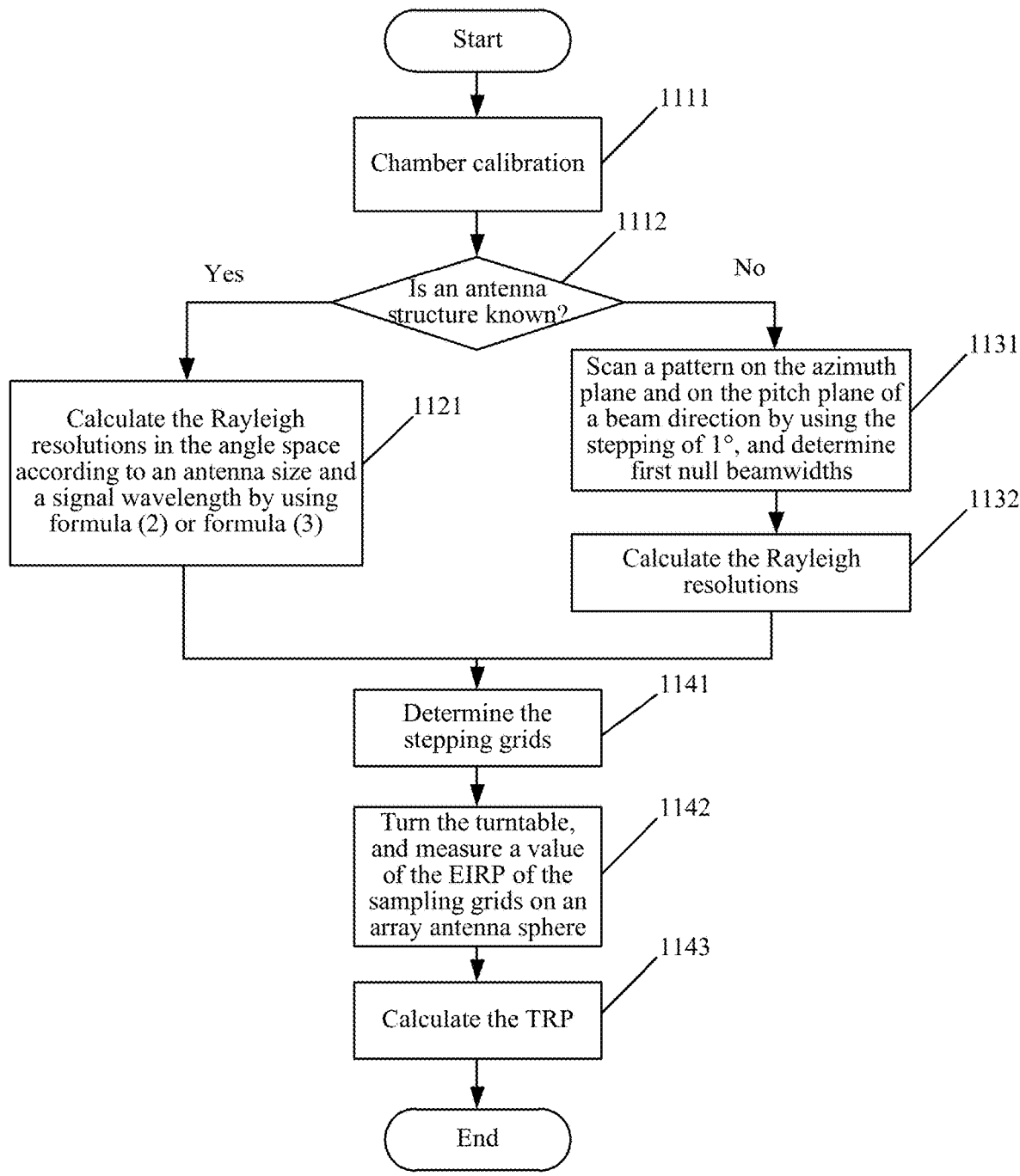
FIG. 11 is a flowchart of a method for measuring TRP of an array antenna by using a uniform sampling scheme according to an application instance of the present disclosure.
Figure 12:
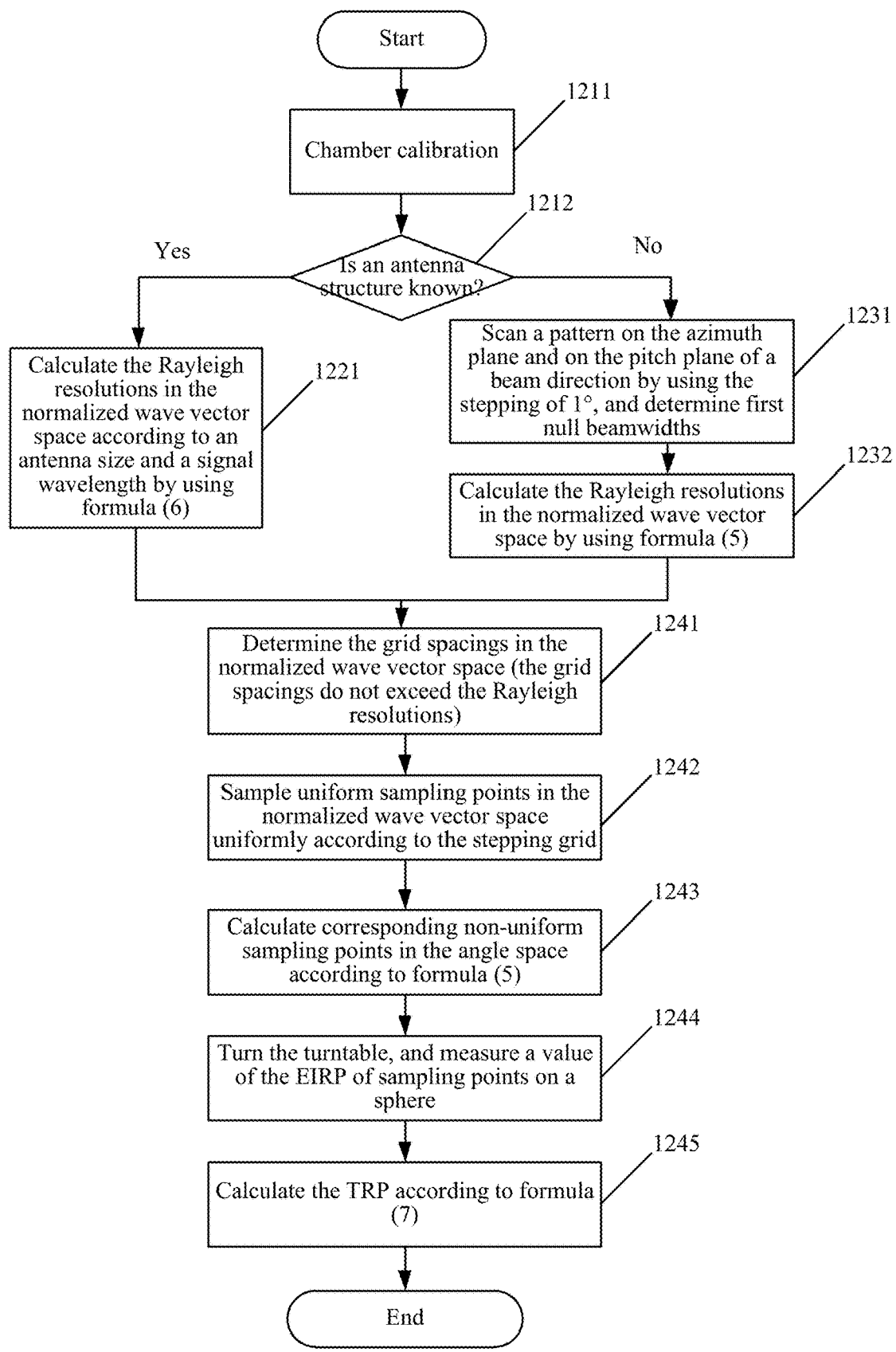
FIG. 12 is a flowchart of a method for measuring TRP of an array antenna by using a non-uniform sampling scheme according to an application instance of the present disclosure.

FIGS. 11 and 12 are flowcharts of several application instances including the uniform sampling scheme and the non-uniform sampling scheme related to the above systems. The four exemplary application instances described below may be provided on the basis of the above discussions. The processing in FIGS. 11 and 12 may be implemented by the test environment of FIG. 2 and the sampling manners of FIGS. 7B and 10B. For simplicity, the methods are described by a series of blocks. However, it is to be understood that the claimed body is not limited by the sequence of the blocks. Some blocks may occur in a sequence different from that described here, and/or simultaneously with other blocks. Additionally, not all the blocks in the instances are necessary to achieve the described effects.

Application Instance One

In this application instance, the antenna size is known, which is represented by $D_y$ and $D_z$ respectively in the y direction and in the z direction, and the uniform sampling scheme is used. The test environment may be, but is not limited to, a far field millimeter wave chamber test system 200. In principle, both a compact field millimeter wave chamber and a near field millimeter wave chamber (where the near field includes a plane field, a cylindrical field and a spherical field) that may implement the antenna pattern measurement may be used as the measurement environment.

FIG. 11 shows the process of a TRP test method based on the uniform sampling scheme. The process includes steps described below.

In step 1111, a full anechoic chamber and the measurement environment of the full anechoic chamber are calibrated, including an air path loss, a cable insertion loss, position parameters of the spherical coordinate system, and the like. This is the basis for subsequent measurement steps. The chamber environment calibration is a normal preparation operation for radio frequency tests.

In step 1112, it is determined whether the size of the integrated antenna is knowable. In this application instance, the antenna size is known, and the process proceeds to step 1121.

In step 1121, since the antenna size is known, the Rayleigh resolutions $\theta_r$ and $\varphi_r$ in the angle space may be directly obtained through formula (2) or formula (3). A result is written into the test machine 250, and the process proceeds to step 1141.

In step 1141, the spacings $\theta_{grid}$ and $\varphi_{grid}$ of the uniform sampling are determined. As mentioned in the description of the sampling diagram of FIG. 7B, the sampling spacings $\theta_{grid}$ and $\varphi_{grid}$ are respectively less than and trend to the Rayleigh resolutions $\theta_r$ and $\varphi_r$ as much as possible. The most economical and effective manner is that the sampling spacings are respectively equal to the Rayleigh resolutions. The sampling spacings are written into the test machine 250 after determined. The process proceeds to step 1142.

In step 1142, through the determined sampling spacings, the test machine 250 calculates an azimuth $(\theta_n, \varphi_{m,n})$ of each sampling point on the front hemisphere where a main beam is located, m and n=0, ±1, ±2 . . . , the number of sampling points is determined, a sampling time is estimated, and the turntable 220 and the measurement antenna support 232 are controlled to turn to azimuths of the determined sampling points (an actual sampling process may be the large circle tangent method or the conical tangent method). Then, the measurement antenna system 230 and the power receive meter 240 measure and record values of the EIRP at the positions of these sampling points. The power receive meter 240 transfers the data to the test machine 250. The process proceeds to step 1143.

In step 1143, after acquiring the values of the EIRP of the sample points, the test machine 250 calculates a value of the TRP using formula (4), a calculated result is outputted, and the test ends.

Application Instance Two

In this application instance, the antenna size is unknown (for example, the antenna has a radome hard to disassemble), and the uniform sampling scheme is used. The test environment may be, but is not limited to, the far field millimeter wave chamber test system 200. In principle, both a compact field millimeter wave chamber and a near field millimeter wave chamber (where the near field includes a plane field, a cylindrical field and a spherical field) that may implement the antenna pattern measurement may be used as the measurement environment.

FIG. 11 shows the process of a TRP test method based on the uniform sampling scheme. The process includes steps described below.

In step 1111, a full anechoic chamber and the measurement environment of the full anechoic chamber are calibrated, including an air path loss, a cable insertion loss, position parameters of the spherical coordinate system, and the like. This is the basis for subsequent measurement steps. The chamber environment calibration is a normal preparation operation for radio frequency tests.

In step 1112, it is determined whether the size of the integrated antenna is knowable. In this embodiment, the antenna size is unknown, and the process proceeds to step 1131.

In step 1131, since the antenna size is unknown, the Rayleigh resolutions are indirectly calculated by testing the first null beamwidth (FNBWs) of the main beam. Thus, in step 1131, a pattern is measured by using a spacing of 1° or less than 1° on the pitch plane and on the azimuth plane where the main beam is located, and the corresponding first null beamwidths $FNBW_\theta$ and $FNBW_\varphi$ are calculated.

In step 1132, the Rayleigh resolutions are calculated through formulas $\theta_r=FNBW_\theta/2$ and $\varphi_r=FNBW_\varphi/2$. After values of the Rayleigh resolutions are written into the test machine 250, the process proceeds to step 1141.

In step 1141, the spacings $\theta_{grid}$ and $\varphi_{grid}$ of the uniform sampling are determined. As mentioned in the description of the sample diagram of FIG. 7B, the sampling spacings $\theta_{grid}$ and $\varphi_{grid}$ are respectively less than and trend to the Rayleigh resolutions $\theta_r$ and $\varphi_r$ as much as possible. The most economical and effective manner is that the sampling spacings are respectively equal to the Rayleigh resolutions. The sampling spacings are written into the test machine 250 after determined. The process proceeds to step 1142.

In step 1142, through the determined sampling spacings, the test machine 250 calculates the azimuth $(\theta_n, \varphi_{m,n})$ of each sampling point on the front hemisphere where the main beam is located, the number of sampling points is determined, the sampling time is estimated, and the turntable 220 and the measurement antenna support 232 are controlled to turn to azimuths of the determined sampling points. The actual sampling process may the large circle tangent method or the conical tangent method. Then, the measurement antenna system 230 and the power receive meter 240 measure and record values of the EIRP at the positions of these sampling points. The power receive meter 240 transfers the data to the test machine 250. The process proceeds to step 1143.

In step 1143, after acquiring the values of the EIRP of the sample points, the test machine 250 calculates a value of the TRP using formula (4), a calculated result is outputted, and the test ends.

The application instances described below is to perform the uniform sampling in the normalized wave vector space, that is, the non-uniform sampling scheme in the angle space. The number of sampling points can be further reduced by using this sampling scheme.

Application Instance Three

In this application instance, the antenna size is known, which is represented by $D_y$ and $D_z$ respectively in the y direction and in the z direction, and the non-uniform sampling scheme is used. The test environment may be, but is not limited to, the far field millimeter wave chamber test system 200. In principle, both a compact field millimeter wave chamber and a near field millimeter wave chamber (where the near field includes a plane field, a cylindrical field and a spherical field) that may implement the antenna pattern measurement may be used as the measurement environment.

FIG. 12 shows the process of a TRP test method based on the non-uniform sampling scheme. The process includes the steps described below.

In step 1211, a full anechoic chamber and the measurement environment of the full anechoic chamber are calibrated, including an air path loss, a cable insertion loss, position parameters of the spherical coordinate system, and the like. This is the basis for subsequent measurement steps. The chamber environment calibration is a normal preparation operation for radio frequency tests.

In step 1212, it is determined whether the size of the integrated antenna is knowable. In this embodiment, the antenna size is known, and the process proceeds to step 1221.

In step 1221, since the antenna size is known, the Rayleigh resolutions $K_{yr}$ and $K_{zr}$ in the normalized wave vector space may be directly obtained through formula (6). A result is written into the test machine 250. The process proceeds to step 1241.

In step 1241, the grid spacings $K_{grid,y}$ and $K_{grid,z}$ of the sampling points in the normalized wave vector space are determined. As mentioned in the description of the sample diagram of FIG. 10B, the sampling spacings $K_{grid,y}$ and $K_{grid,z}$ are respectively less than and trend to the Rayleigh resolutions $K_{yr}$ and $K_{zr}$ as much as possible. The most economical and effective manner is that the sampling spacings are respectively equal to the Rayleigh resolutions. The sampling spacings are written into the test machine 250 after determined. The process proceeds to step 1242.

In step 1242, the test machine 250 calculates discrete sampling points in the normalized wave vector space through the determined sampling spacings. That is, $\vec{K}_{n,m}=\hat{z}K_{zn}+\hat{y}K_{ym}$.

These discrete points are filtered, only sampling points having a modulus value satisfying $|\vec{K}_{m,n}|<1$ are selected. The reason for such a filtering is that electromagnetic modes that can be transmitted over a long distance through an air interface are all radiation modes. After the sampling points are filtered in the normalized wave vector space, the number of sampling points may be determined, and the sampling time is estimated. The process proceeds to step 1243.

In step 1243, after acquiring the filtered sampling points, the test machine 250 transforms these sampling points in the normalized wave vector space into the angle space through formula (5) to obtain non-uniformly distributed sampling points $(\theta_n, \varphi_{m,n})$ in the angle space. Then, the process proceeds to step 1244.

In step 1244, the test machine 250 controls the turntable 220 and the measurement antenna support 232 to turn to azimuths of the determined sampling points. Then, the measurement antenna system 230 and the power receive meter 240 measure and record values of the EIRP at the azimuths of these sampling points. The power receive meter 240 transfers the data to the test machine 250. The process proceeds to step 1245.

In step 1245, after acquiring the values of the EIRP of the sample points, the test machine 250 calculates a value of the TRP by using formula (7), a calculated result is outputted, and the test ends.

Application Instance Four

In this application instance, the antenna size is unknown (for example, an antenna has a radome not easy to disassemble), and the non-uniform sampling scheme is used. The test environment may be, but is not limited to, the far field millimeter wave chamber test system 200. In principle, both a compact field millimeter wave chamber and a near field millimeter wave chamber (where the near field includes a plane field, a cylindrical field and a spherical field) that may implement the antenna pattern measurement may be used as the measurement environment.

FIG. 12 shows the process of a TRP test method based on the non-uniform sampling scheme. The process includes steps described below.

In step 1211, a full anechoic chamber and the measurement environment of the full anechoic chamber are calibrated, including an air path loss, a cable insertion loss, position parameters of the spherical coordinate system, and the like. This is the basis for subsequent measurement steps. The chamber environment calibration is a normal preparation operation for radio frequency tests.

In step 1212, it is determined whether the size of the integrated antenna is knowable. In this embodiment, the antenna size is unknown, and the process proceeds to step 1231.

In step 1231, since the antenna size is unknown, the Rayleigh resolutions are indirectly calculated by testing the first null beamwidth (FNBWs) of the main beam. Thus, in step 1231, a pattern is measured by using a spacing of 1° or less than 1° on the pitch plane and on the azimuth plane where the main beam is located, and the corresponding first null beamwidths $FNBW_\theta$ and $FNBW_\varphi$ are calculated. The Rayleigh resolutions are calculated through formulas $\theta_r=FNBW_\theta/2$ and $\varphi_r=FNBW_\varphi/2$.

In step 1232, the Rayleigh resolutions $\theta_r$ and $\varphi_r$ in an angle space are transformed to the Rayleigh resolutions $K_{yr}$ and $K_{zr}$ in the normalized wave vector space by using transformation formula (5), and the process proceeds to step 1241.

In step 1241, the grid spacings $K_{grid,y}$ and $K_{grid,z}$ of the sampling points in the normalized wave vector space is determined. As mentioned in the description of the sample diagram of FIG. 10B, the sampling spacings $K_{grid,y}$ and $K_{grid,z}$ are respectively less than and trend to the Rayleigh resolutions $K_{yr}$ and $K_{zr}$ as much as possible. The most economical and effective manner is that the sampling spacings are respectively equal to the Rayleigh resolutions. The sampling spacings are written into the test machine 250 after determined. The process proceeds to step 1242.

In step 1242, the test machine 250 calculates discrete sampling points in the normalized wave vector space through the determined sampling spacings. That is, $\vec{K}_{n,m}=\hat{z}K_{zn}+\hat{y}K_{ym}$.

These discrete points are filtered, only sampling points having a modulus value satisfying $|K_{m,n}|<1$ are selected. The reason for such a filtering is that electromagnetic modes that can be transmitted over a long distance through an air interface are all radiation modes. After the sampling points are filtered in the normalized wave vector space, the number of sampling points may be determined, and the sampling time is estimated. The process proceeds to step 1243.

In step 1243, after acquiring the filtered sampling points, the test machine 250 transforms these sampling points in the normalized wave vector space into the angle space through formula (5) to obtain sampling points $(\theta_n, \varphi_{m,n})$ non-uniformly distributed in the angle space. Then, the process proceeds to step 1244.

In step 1244, the test machine 250 controls the turntable 220 and the measurement antenna support 232 to turn to azimuths of the determined sampling points. Then, the measurement antenna system 230 and the power receive meter 240 measure and record values of the EIRP at the azimuths of these sampling points. The power receive meter 240 transfers the data to the test machine 250. The process proceeds to step 1245.

In step 1245, after acquiring the values of the EIRP of the sample points, the test machine 250 calculates a value of the TRP by using formula (7), a calculated result is outputted, and the test ends.

Figure 13:
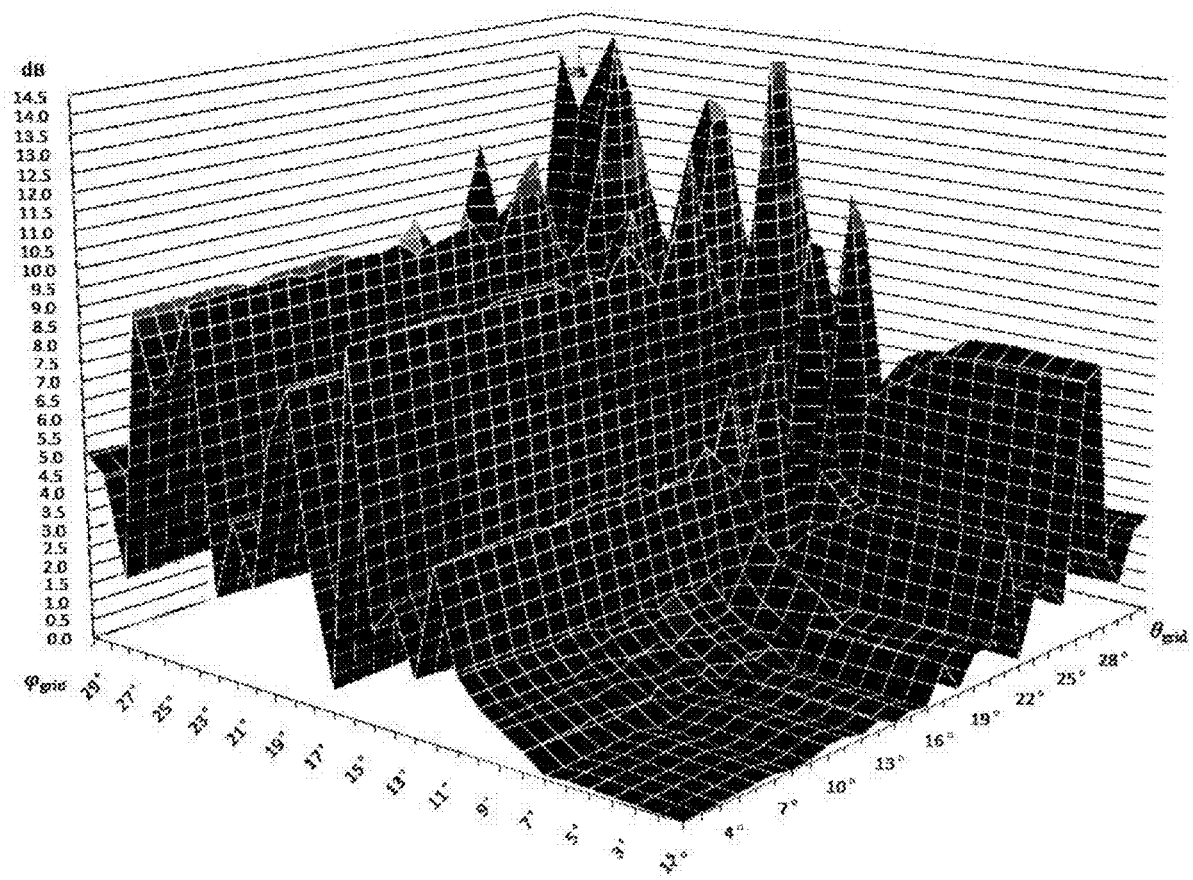
FIG. 13 is a distribution diagram of TRP errors calculated in two dimensions of $\theta_{grid}$ and $\varphi_{grid}$ in a case where $\theta_{grid}$ and $\varphi_{grid}$ of an 8×16 element array each vary from 1° to 30°.

FIG. 13 is a verification result of angle grid values. An 8×16-element array is used for experiments. A unit spacing of the array antenna is 0.5λ. Bottom coordinate axes of a three-dimensional coordinate system are $\varphi_{grid}$ and $\theta_{grid}$, each of which has a range from 1° to 30°. A value of the TRP is calculated according to formula (1). Errors are three-dimensionally distributed. As seen from FIG. 13, flat regions of the error distribution locate at $\varphi_{grid}\leq7°$ and $\theta_{grid}\leq15°$. The Rayleigh resolutions calculated according to formula (2) or formula (3) are $\varphi_r\approx7.2°$ and $\theta_r 14.5°$. It can be seen that the maximum values of the sampling spacings tend to the Rayleigh resolutions to ensure the measurement accuracy, which is consistent with the discussions in the embodiments of the present disclosure.

An embodiment of the present disclosure further provides a computer-readable storage medium. The storage medium stores computer-executable instructions for implementing the steps of any method for measuring TRP of an array antenna described above.

An embodiment of the present disclosure further provides an electronic apparatus. The apparatus includes a memory and a processor. The memory stores a computer program. The processor is configured to execute the computer program to implement the steps in any method embodiment above.

It is to be understood by those of ordinary skill in the art that functional modules/units in all or part of the steps of the method, the system and the apparatus disclosed above may be implemented as software, firmware, hardware and appropriate combinations thereof. In the hardware implementation, the division of the functional modules/units mentioned in the above description may not correspond to a division of physical components. For example, one physical component may have several functions, or one function or step may be implemented jointly by several physical components. Some or all of the components may be implemented as software executed by a processor such as a digital signal processor or a microprocessor, may be implemented as hardware, or may be implemented as an integrated circuit such as an application-specific integrated circuit. Such software may be distributed over computer-readable media. The computer-readable media may include computer storage media (or non-transitory media) and communication media (or transitory media). As is known to those of ordinary skill in the art, the term computer storage media include volatile and non-volatile as well as removable and non-removable media implemented in any method or technology for storing information (such as computer-readable instructions, data structures, program modules or other data). The computer storage medium includes, but is not limited to, a random access memory (RAM), a read only memory (ROM), an electrically erasable programmable read only memory (EEPROM), a flash memory or other memory technologies, a compact disc read only memory (CD-ROM), a digital versatile disc (DVD) or other optical disc storages, a magnetic cassette, a magnetic tape, a magnetic disk storage or other magnetic storage apparatuses, or any other medium used for storing desired information and accessible for a computer. Moreover, it is known to those of ordinary skill in the art that communication media typically include computer-readable instructions, data structures, program modules or other data in a modulated data signal such as a carrier wave or other transport mechanisms, and may include any information delivery medium.

INDUSTRIAL APPLICABILITY

As describe above, a method, apparatus and system for measuring total radiated power of an array antenna according to embodiments of the present disclosure have the following beneficial effects: compared with a traditional test manner using the angle stepping grids θgrid and φgrid of 15°, the measurement errors are reduced in the embodiments of the present disclosure; and additionally, through a normalized wave vector space transformation, the number of sampling points is further reduced, and the measurement efficiency is improved.

What is claimed is:

1. A method for measuring total radiated power (TRP) of an array antenna, comprising:

determining Rayleigh resolutions of the array antenna in an angle space, and setting stepping grid spacings of sampling points according to the Rayleigh resolutions; and determining the sampling points according to the stepping grid spacings, measuring equivalent isotropic radiated power (EIRP) at positions of the sampling points, and determining the TRP according to the EIRP, wherein determining the Rayleigh resolutions of the array antenna in the angle space comprises: determining the Rayleigh resolutions of the array antenna in the angle space according to a signal wavelength and an array size of the array antenna, wherein the Rayleigh resolutions of the array antenna in the angle space is determined using a Rayleigh resolution of the array antenna in a θ direction of a spherical coordinate system as follows $$\frac{180°}{\pi}\sin^{-1}\left(\frac{\lambda}{D_z}\right)$$

and using a Rayleigh resolution of the array antenna in a φ direction of the spherical coordinate system as follows $$\frac{180°}{\pi}\sin^{-1}\left(\frac{\lambda}{D_y}\right),$$

wherein $D_y$ denotes a maximum antenna aperture of the array antenna in a horizontal direction and $D_z$ denotes a maximum antenna aperture of the array antenna in a vertical direction, and $\lambda$ denotes the signal wavelength.

2. The method of claim 1, wherein the array is a rectangular array.

3. The method of claim 1, wherein setting the stepping grid spacings of the sampling points according to the Rayleigh resolutions comprises:

setting the stepping grid spacings of sampling points to be less than or equal to the Rayleigh resolutions.

4. The method of claim 1, wherein the TRP is determined according to the EIRP in the following manner:

$$TRP = \frac{\pi}{4NM}\sum_{n=0}^{N-1}\sum_{m=0}^{M-1}(\theta_n, \phi_m)\sin(\theta_n);$$

where $$M = \frac{180°}{\phi_{grid}}, N = \frac{180°}{\theta_{grid}}, \theta_{grid}$$

denotes a stepping grid spacing in a θ direction of a spherical coordinate system and $\phi_{grid}$ denotes a stepping grid spacing in a φ direction of the spherical coordinate system.

5. An apparatus for measuring total radiated power (TRP) of an array antenna, comprising a processor, the processor being configured to:

determine Rayleigh resolutions of the array antenna in an angle space, and set stepping grid spacings of sampling points according to the Rayleigh resolutions; and determine the sampling points according to the stepping grid spacings, measure equivalent isotropic radiated power (EIRP) at positions of the sampling points, and determine the TRP according to the EIRP, wherein for determining the Rayleigh resolutions of the array antenna in the angle space, the processor is configured to: determine the Rayleigh resolutions of the array antenna in the angle space according to a signal wavelength and an array size of the array antenna, wherein the processor is configured to determine the Rayleigh resolutions of the array antenna in the angle space using a Rayleigh resolution of the array antenna in a θ direction of a spherical coordinate system as follows $$\frac{180°}{\pi}\sin^{-1}\left(\frac{\lambda}{D_z}\right)$$

and using a Rayleigh resolution of the array antenna in a φ direction of the spherical coordinate system as follows $$\frac{180°}{\pi}\sin^{-1}\left(\frac{\lambda}{D_y}\right),$$

wherein $D_y$ denotes a maximum antenna aperture of the array antenna in a horizontal direction and $D_z$ denotes a maximum antenna aperture of the array antenna in a vertical direction, and λ denotes the signal wavelength.

6. The apparatus of claim 5, wherein the array is a rectangular array.

7. The apparatus of claim 5, wherein for setting the stepping grid spacings of the sampling points according to the Rayleigh resolutions, the processor is configured to:
set the stepping grid spacings of sampling points to be less than or equal to the Rayleigh resolutions.

8. The apparatus of claim 5, wherein the processor is configured to determine the TRP according to the EIRP in the following manner:

$$TRP = \frac{\pi}{4NM}\sum_{n=0}^{N-1}\sum_{m=0}^{M-1}(\theta_n, \phi_m)\sin(\theta_n);$$

where $$M = \frac{180°}{\phi_{grid}}, N = \frac{180°}{\theta_{grid}}, \theta_{grid}$$

denotes a stepping grid spacing in a θ direction of a spherical coordinate system and $\phi_{grid}$ denotes a stepping grid spacing in a φ direction of the spherical coordinate system.

9. A system for measuring total radiated power (TRP) of an array antenna, comprising:
an equipment under test fixed on a turntable, a test antenna system, a power detector and a test machine, wherein the equipment under test comprises the array antenna and a radio remote unit which are integrated together, the power detector is connected to the test antenna system, and the test machine is connected to the equipment under test, the turntable, the test antenna system and the power detector, respectively; and
wherein the test machine is configured to:
determine Rayleigh resolutions of the array antenna in an angle space, and set stepping grid spacings of sampling points according to the Rayleigh resolutions; and
determine the sampling points according to the stepping grid spacings, measure equivalent isotropic radiated power (EIRP) at positions of the sampling points, and determine the TRP according to the EIRP,
wherein to determine the Rayleigh resolutions of the array antenna in the angle space comprises: to determine the Rayleigh resolutions of the array antenna in the angle space according to a signal wavelength and an array size of the array antenna,
wherein the Rayleigh resolutions of the array antenna in the angle space is determined using a Rayleigh resolution of the array antenna in a θ direction of a spherical coordinate system as follows $$\frac{180°}{\pi}\sin^{-1}\left(\frac{\lambda}{D_z}\right)$$

and using a Rayleigh resolution of the array antenna in a φ direction of the spherical coordinate system as follows $$\frac{180°}{\pi}\sin^{-1}\left(\frac{\lambda}{D_y}\right),$$

wherein $D_y$ denotes a maximum antenna aperture of the array antenna in a horizontal direction and $D_z$ denotes a maximum antenna aperture of the array antenna in a vertical direction, and λ denotes the signal wavelength.

10. The system of claim 9, wherein the array is a rectangular array.

11. The system of claim 9, wherein to set the stepping grid spacings of the sampling points according to the Rayleigh resolutions comprises:
to set the stepping grid spacings of sampling points to be less than or equal to the Rayleigh resolutions.

12. The system of claim 9, wherein the TRP is determined according to the EIRP in following manner:

$$TRP = \frac{\pi}{4NM}\sum_{n=0}^{N-1}\sum_{m=0}^{M-1}EIRP(\theta_n, \phi_m)\sin(\theta_n);$$

where $$M = \frac{180°}{\phi_{grid}}, N = \frac{180°}{\theta_{grid}},$$

$\theta_{grid}$ denotes a stepping grid spacing in a θ direction of a spherical coordinate system and $\phi_{grid}$ denotes a stepping grid spacing in a φ direction of the spherical coordinate system.

* * * * *